(12) United States Patent
Nishino

(10) Patent No.: US 12,525,403 B2
(45) Date of Patent: Jan. 13, 2026

(54) MULTILAYER CERAMIC ELECTRONIC COMPONENT

(71) Applicant: Murata Manufacturing Co., Ltd., Nagaokakyo (JP)

(72) Inventor: Yoshiro Nishino, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 127 days.

(21) Appl. No.: 18/618,265

(22) Filed: Mar. 27, 2024

(65) Prior Publication Data
US 2025/0279242 A1    Sep. 4, 2025

(30) Foreign Application Priority Data
Mar. 4, 2024    (JP) .................................. 2024-032039

(51) Int. Cl.
| | |
|---|---|
| *H01G 4/232* | (2006.01) |
| *H01G 2/06* | (2006.01) |
| *H01G 4/008* | (2006.01) |
| *H01G 4/012* | (2006.01) |
| *H01G 4/12* | (2006.01) |
| *H01G 4/30* | (2006.01) |

(52) U.S. Cl.
CPC ............... *H01G 4/30* (2013.01); *H01G 2/065* (2013.01); *H01G 4/008* (2013.01); *H01G 4/012* (2013.01); *H01G 4/1227* (2013.01); *H01G 4/232* (2013.01)

(58) Field of Classification Search
CPC ........ H01G 4/232; H01G 4/1245; H01G 4/30; H01G 4/065; H01G 4/008; H01G 4/012; H01G 4/1227
See application file for complete search history.

(56) References Cited

U.S. PATENT DOCUMENTS

| | | | |
|---|---|---|---|
| 10,026,556 B2 * | 7/2018 | Ando .................. | H01G 4/232 |
| 2014/0151101 A1 * | 6/2014 | Lee ...................... | H01G 4/12 |
| | | | 156/89.12 |
| 2014/0326493 A1 * | 11/2014 | Lee ...................... | H05K 1/0306 |
| | | | 361/301.4 |

(Continued)

FOREIGN PATENT DOCUMENTS

| | | | |
|---|---|---|---|
| CN | 105206424 A | * | 12/2015 |
| JP | 2003-243249 A | | 8/2003 |

(Continued)

*Primary Examiner* — Michael P Mcfadden
(74) *Attorney, Agent, or Firm* — Keating & Bennett, LLP

(57) ABSTRACT

A multilayer ceramic capacitor includes a multilayer body and external electrodes at both end portions of the multilayer body. The external electrodes include main surface-side external electrodes. In a cross-sectional view along a lamination direction and a length direction, main surface-side external electrodes include a recess recessed towards a side of the multilayer body, a first bulge on a central side of the multilayer body in the length direction, and a second bulge at an end portion side of the multilayer body in the length direction, between which the recess is interposed. A distance between a vertex of the first bulge and a vertex of the second bulge in the length direction is longer than a distance between an inner end portion of the main surface-side external electrode and the vertex of the first bulge in the length direction.

20 Claims, 12 Drawing Sheets

(56) References Cited

U.S. PATENT DOCUMENTS

| | | | |
|---|---|---|---|
| 2015/0041194 A1* | 2/2015 | Shim | H01G 2/065 |
| | | | 361/301.4 |
| 2015/0053472 A1* | 2/2015 | Lee | H01G 4/232 |
| | | | 361/301.4 |
| 2015/0098202 A1* | 4/2015 | Lee | H01G 4/232 |
| | | | 361/761 |
| 2018/0182550 A1* | 6/2018 | Sasaki | H01G 4/232 |
| 2019/0157004 A1 | 5/2019 | Park et al. | |
| 2020/0029438 A1 | 1/2020 | Sasaki | |
| 2021/0280374 A1* | 9/2021 | Nishikawa | H05K 1/181 |
| 2022/0208459 A1 | 6/2022 | Muramatsu | |
| 2023/0093850 A1* | 3/2023 | Yatagawa | H01G 4/012 |
| | | | 361/301.4 |

FOREIGN PATENT DOCUMENTS

| | | |
|---|---|---|
| JP | 2020017557 A | 1/2020 |
| KR | 20190059008 A | 5/2019 |
| KR | 20220092376 A | 7/2022 |

\* cited by examiner

MULTILAYER CERAMIC ELECTRONIC COMPONENT

CROSS REFERENCE TO RELATED APPLICATIONS

This application is based on and claims the benefit of priority from Japanese Patent Application No. 2024-032039, filed on Mar. 4, 2024, the contents of which are incorporated herein by reference.

BACKGROUND OF THE INVENTION

1. Field of the Invention

The present invention relates to multilayer ceramic electronic components.

2. Description of the Related Art

Conventionally, multilayer ceramic capacitors as a type of multilayer ceramic electronic component are known. In general, a multilayer ceramic capacitor includes a rectangular multilayer body in which a plurality of dielectric layers and a plurality of internal electrode layers are alternately stacked, and external electrodes on both end surfaces of the multilayer body. For example, Japanese Unexamined Patent Application Publication No. 2003-243249 discloses a multilayer ceramic capacitor with the abovementioned structure, in which the external electrodes include a base electrode layer formed by firing.

Typically, the external electrode of the multilayer ceramic capacitor is also provided on the main surface side, which is the widest plane of the rectangular multilayer body. The shape of the surface of the external electrode on the main surface side is rounded as a whole. In this case, when mounting the multilayer ceramic capacitor on a board, the ground contact area between the external electrodes and the board may be reduced, potentially leading to instability during the mounting process.

SUMMARY OF THE INVENTION

Example embodiments of the present invention provide multilayer ceramic capacitors that each facilitate stability during a mounting process.

A multilayer ceramic capacitor according to an example embodiment of the present invention includes a multilayer body that includes a plurality of ceramic layers and a plurality of inner conductive layers stacked alternately in a height direction, a first main surface and a second main surface on opposite sides in the height direction, a first end surface and a second end surface on opposite sides in a length direction orthogonal or substantially orthogonal to the height direction, a first lateral surface and a second lateral surface on opposite sides in a width direction orthogonal or substantially orthogonal to both of the height direction and the length direction, and a pair of external electrodes spaced apart from each other at both end portions of the multilayer body in the length direction. The inner conductive layers include a first inner conductive layer extending to the first end surface and a second inner conductive layer extending to the second end surface. The external electrodes include a main surface-side external electrode on at least one of the first main surface or the second main surface. In a cross-sectional view along the height and the length directions, the main surface-side external electrode includes, on a surface thereof, a recess recessed towards a side of the multilayer body, a first bulge on a central side of the multilayer body in the length direction, and a second bulge at an end portion side of the multilayer body in the length direction, between which the recess is interposed. A distance between a vertex of the first bulge and a vertex of the second bulge in the length direction is longer than a distance between an inner end portion of the main surface-side external electrode and a vertex of the first bulge in the length direction.

Example embodiments of the present invention are each able to provide a multilayer ceramic capacitor that facilitates stability during a mounting process.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Example embodiments of the present invention will be described in detail below with reference to the drawings.

Figure 1:
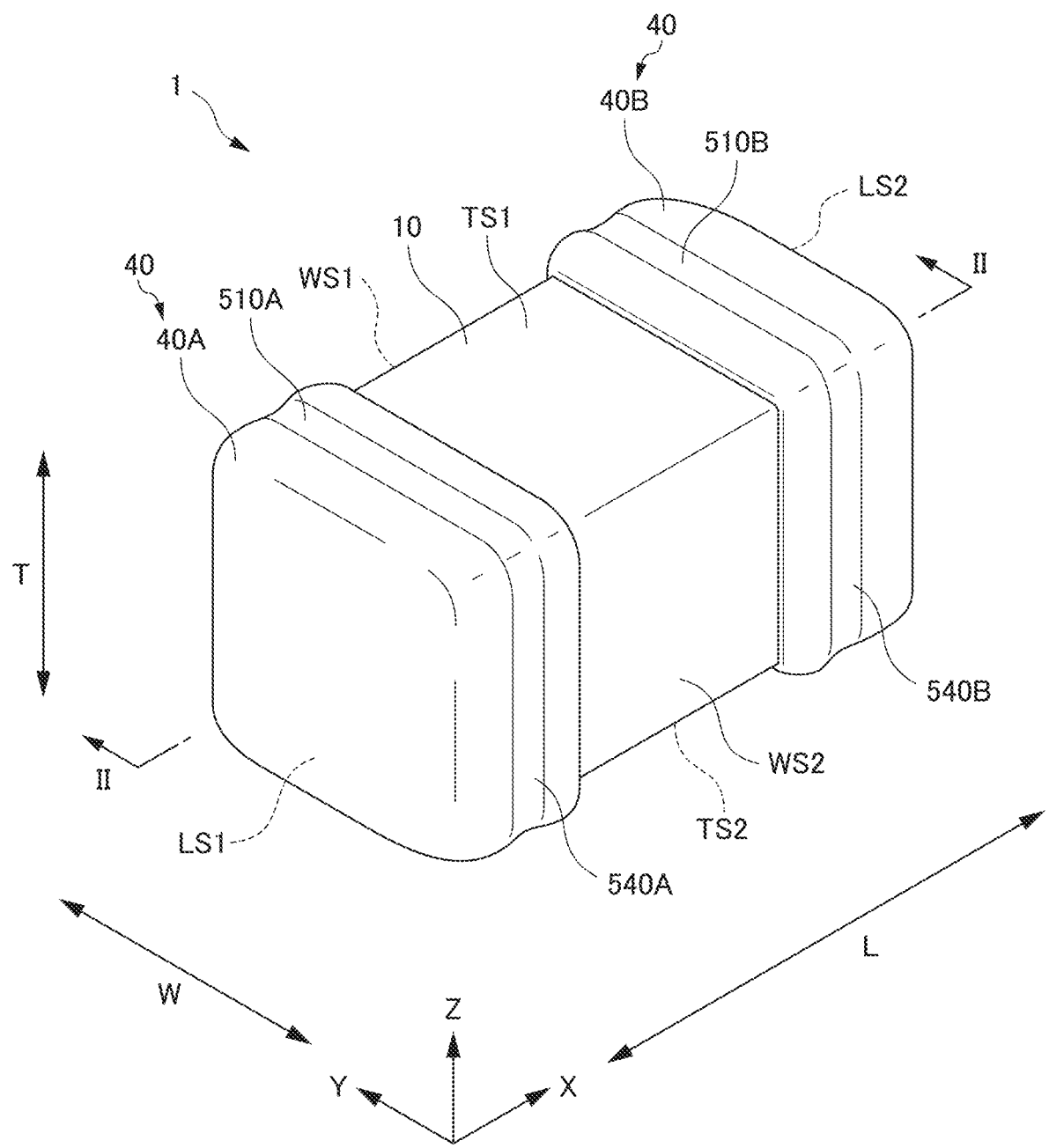
FIG. 1 is a perspective view of a multilayer ceramic capacitor according to an example embodiment of the present invention.
Figure 2:
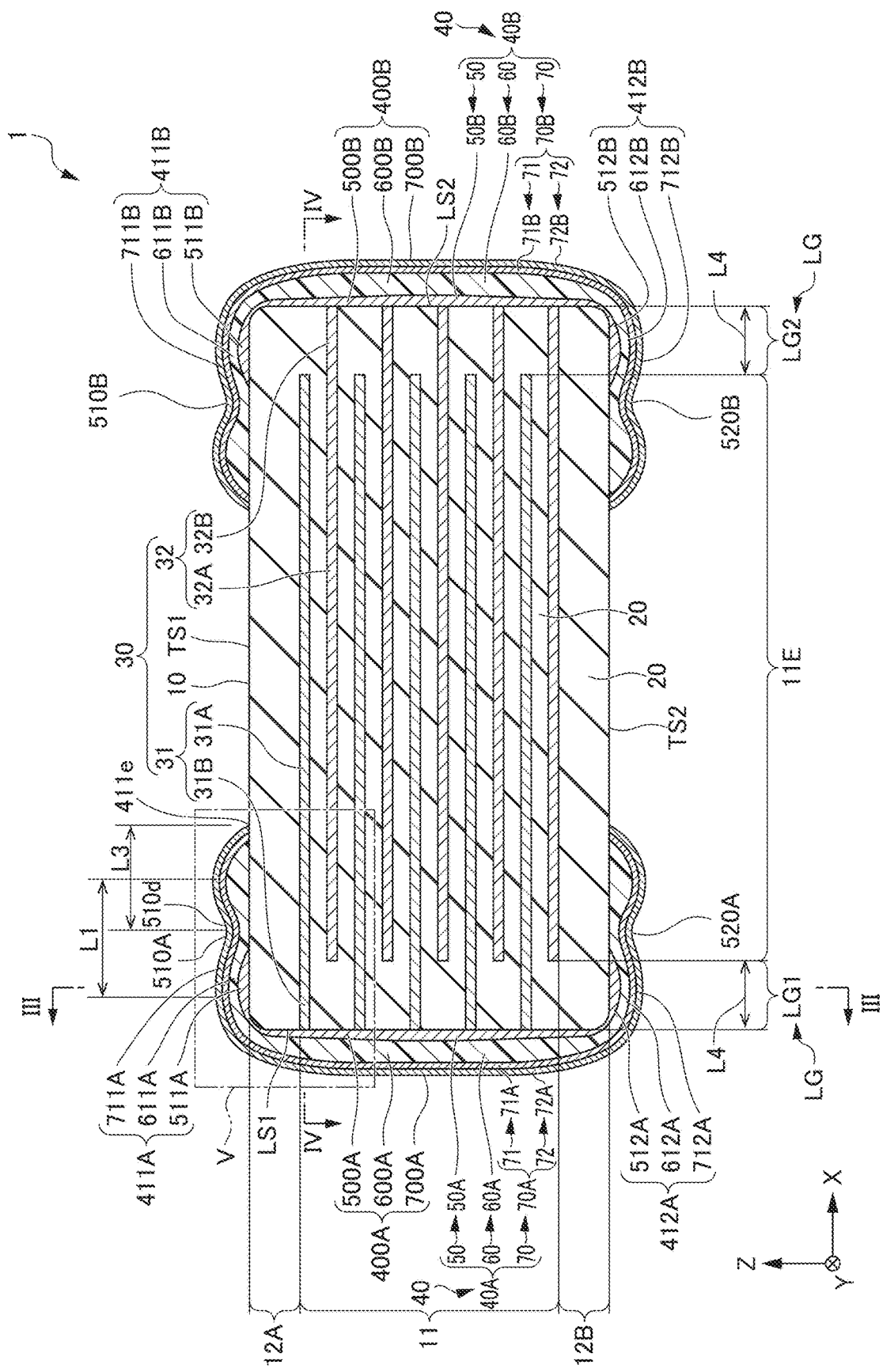
FIG. 2 is a cross-sectional view taken along the line II-II of FIG. 1.
Figure 3:
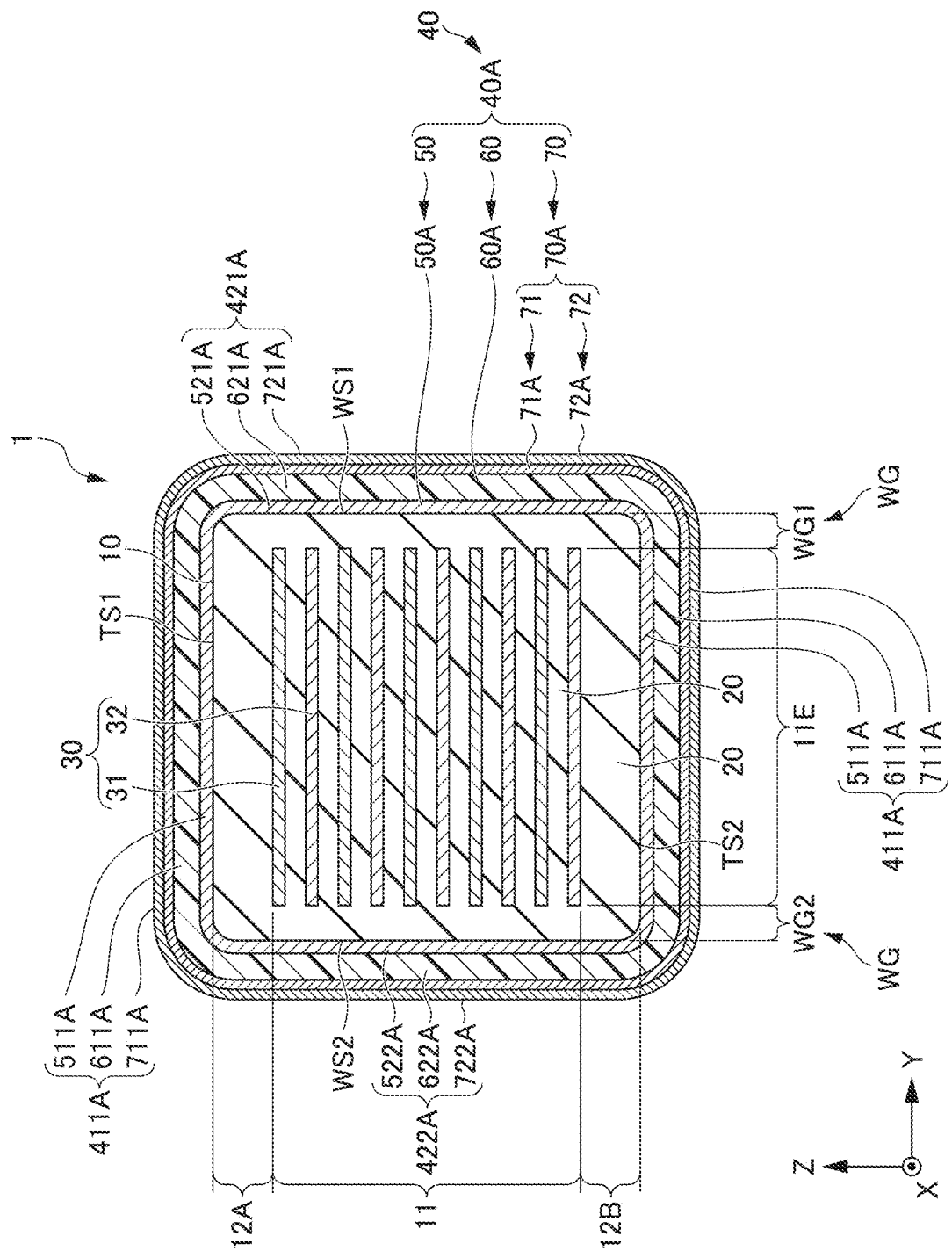
FIG. 3 is a cross-sectional view taken along the line III-III of FIG. 2.
Figure 4:
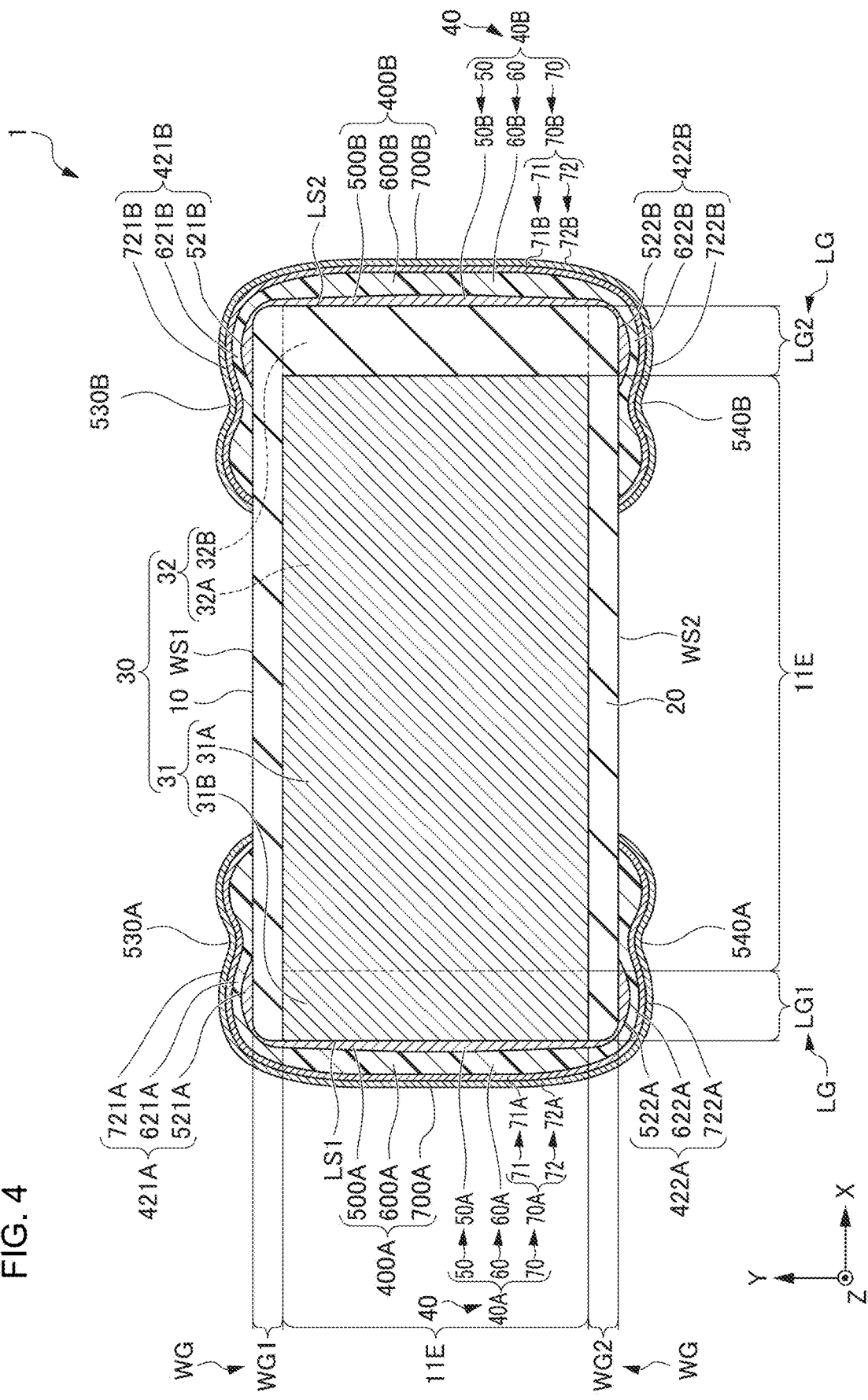
FIG. 4 is a cross-sectional view taken along the line IV-IV of FIG. 2.

Hereinafter, a multilayer ceramic capacitor 1 as a multilayer ceramic electronic component according to an example embodiment of the present invention will be described with reference to FIGS. 1 to 4. FIG. 1 is a perspective view of the multilayer ceramic capacitor 1 according to the present example embodiment. FIG. 2 is a cross-sectional view taken along the line II-II of the multilayer ceramic capacitor 1 in FIG. 1. FIG. 3 is a cross-sectional view taken along the line III-III of the multilayer ceramic capacitor 1 in FIG. 2. FIG. 4 is a cross-sectional view taken along the line IV-IV of the multilayer ceramic capacitor 1 in FIG. 2.

The multilayer ceramic capacitor 1 includes a multilayer body 10 and external electrodes 40.

FIGS. 1 to 4 illustrate an XYZ orthogonal coordinate system. The length direction L of the multilayer ceramic capacitor 1 and the multilayer body 10 corresponds to the X direction. The width direction W of the multilayer ceramic capacitor 1 and the multilayer body 10 corresponds to the Y direction. The lamination direction T as a height direction of the multilayer ceramic capacitor 1 and the multilayer body 10 corresponds to the Z direction. The cross section illustrated in FIG. 2 is also referred to as an LT cross section. The cross section illustrated in FIG. 3 is also referred to as a WT cross section. The cross section illustrated in FIG. 4 is also referred to as an LW cross section.

As illustrated in FIGS. 1 to 4, the multilayer body 10 includes a first main surface TS1 and a second main surface TS2 on opposite sides in the lamination direction T, a first lateral surface WS1 and a second lateral surface WS2 on opposite sides in the width direction W orthogonal or substantially orthogonal to the lamination direction T, and a first end surface LS1 and a second end surface LS2 on opposite sides in the length direction L orthogonal or substantially orthogonal to both the lamination direction T and the width direction W.

As illustrated in FIG. 1, the multilayer body 10 has a rectangular or substantially rectangular parallelepiped shape. The dimension in the length direction L of the multilayer body 10 is not necessarily longer than the dimension in the width direction W. The corners and edges of the multilayer body 10 are preferably rounded. The corners are where three faces of the multilayer body intersect, and the edges are where two faces of the multilayer body intersect. The surfaces of the multilayer body 10 may include irregularities in whole or in part.

The dimensions of the multilayer body 10 are not particularly limited. However, the dimension of the multilayer body 10 in the length direction L, denoted as the L dimension, is preferably, for example, between about 0.2 mm and about 10 mm inclusive. The dimension of the multilayer body 10 in the lamination direction T, denoted as the T dimension, is preferably, for example, between about 0.1 mm and about 10 mm inclusive. The dimension of the multilayer body 10 in the width direction W, denoted as the W dimension, is preferably, for example, between about 0.1 mm and about 10 mm inclusive.

As illustrated in FIGS. 2 and 3, the multilayer body 10 includes an inner layer portion 11, and a first main surface-side outer layer portion 12A and a second main surface-side outer layer portion 12B, with the inner layer portion 11 being interposed between the first main surface-side outer layer portion 12A and the second main surface-side outer layer portion 12B in the lamination direction T.

The inner layer portion 11 includes a plurality of dielectric layers 20 as a plurality of ceramic layers, and a plurality of internal electrode layers 30 as a plurality of inner conductive layers. The internal electrode layers 30 included in the inner layer portion 11 range from an internal electrode layer 30 closest to the first main surface TS1 to another internal electrode layer 30 closest to the second main surface TS2, in the lamination direction T. In the inner layer portion 11, the plurality of internal electrode layers 30 face each other via the dielectric layers 20. The inner layer portion 11 generates capacitance, and essentially defines and functions as a capacitor.

The dielectric layers 20 are made of dielectric materials. The dielectric materials may be dielectric ceramics including components such as, for example, $BaTiO_3$, $CaTiO_3$, $SrTiO_3$, or $CaZrO_3$. In addition to these main components, the dielectric materials may include accessory components such as, for example, Mn compounds, Fe compounds, Cr compounds, Co compounds, or Ni compounds.

The thickness of the dielectric layers 20 is preferably, for example, between about 0.5 μm and about 30 μm inclusive. The number of dielectric layers 20 to be stacked (laminated) is preferably, for example, between 10 and 1500 inclusive. The number of dielectric layers 20 is the total of the number of dielectric layers in the inner layer portion 11, and the number of the dielectric layers in the first main surface-side outer layer portion 12A and the second main surface-side outer layer portion 12B.

The plurality of internal electrode layers 30 include first internal electrode layers 31 as a plurality of first inner conductive layers, and second internal electrode layers 32 as a plurality of second inner conductive layers. The plurality of first internal electrode layers 31 are provided on the plurality of dielectric layers 20. The plurality of second internal electrode layers 32 are provided on the plurality of dielectric layers 20. The plurality of first internal electrode layers 31 and the plurality of second internal electrode layers 32 are alternately provided in the lamination direction T of the multilayer body 10, with the dielectric layers 20 being interposed therebetween. Each of the first internal electrode layers 31 and each of the second internal electrode layers 32 are provided such that a dielectric layer 20 of the dielectric layers 20 is interposed therebetween. Hereinafter, unless necessary to distinguish, the first internal electrode layers 31 and the second internal electrode layers 32 may collectively be referred to as the internal electrode layers 30.

The first internal electrode layer 31 includes a first counter portion 31A facing the second internal electrode layer 32, and a first extension portion 31B extending from the first counter portion 31A to the first end surface LS1. The first extension portion 31B is exposed at the first end surface LS1.

The second internal electrode layer 32 includes a second counter portion 32A facing the first internal electrode layer 31, and a second extension portion 32B extending from the second counter portion 32A to the second end surface LS2. The second extension portion 32B is exposed at the second end surface LS2.

In the present example embodiment, the first counter portion 31A and the second counter portion 32A face each other, with the dielectric layer 20 being interposed therebetween, thus generating capacitance and providing the characteristics of the capacitor.

The shapes of the first counter portion 31A and the second counter portion 32A are not particularly limited but are preferably rectangular or substantially rectangular. However, the corners of the rectangular-shaped portions may be rounded or formed diagonally. The shapes of the first extension portion 31B and the second extension portion 32B are not particularly limited but are preferably rectangular or substantially rectangular. However, the corners of the rectangular-shaped portions may be rounded or formed diagonally.

Both of the dimensions of the first counter portion 31A and the first extension portion 31B in the width direction W may be the same, or one of the dimensions may be smaller. Both of the dimensions of the second counter portion 32A and the second extension portion 32B in the width direction W may be the same, or one of the dimensions may be smaller.

The first internal electrode layers 31 and the second internal electrode layers 32 include appropriate conductive materials such as, for example, Ni, Cu, Ag, Pd, Au, or alloys including at least one of these metals. When using an alloy, for example, the first internal electrode layers 31 and the second internal electrode layers 32 may include, for example, Ag—Pd alloy.

The thickness of the first internal electrode layers 31 and the second internal electrode layers 32 is preferably, for example, between about 0.2 μm and about 2.0 μm inclusive. The total number of the first internal electrode layers 31 and the second internal electrode layers 32 is, for example, preferably between 10 and 1500 inclusive.

The first main surface-side outer layer portion 12A is provided on the first main surface TS1 side of the multilayer body 10. The first main surface-side outer layer portion 12A is a collective portion including the plurality of dielectric layers 20 between the first main surface TS1 and the internal electrode layer 30 closest to the first main surface TS1. The dielectric layers 20 used in the first main surface-side outer layer portion 12A may be the same as the dielectric layers 20 used in the inner layer portion 11, or may be dielectric layers including different materials.

The second main surface-side outer layer portion 12B is provided on the second main surface TS2 side of the multilayer body 10. The second main surface-side outer layer portion 12B is a collective portion including the plurality of dielectric layers 20 between the second main surface TS2 and the internal electrode layer 30 closest to the second main surface TS2. The dielectric layers 20 used in the second main surface-side outer layer portion 12B may be the same as the dielectric layers 20 used in the inner layer portion 11, or may be dielectric layers include different materials.

The multilayer body 10 includes a counter electrode portion 11E. The counter electrode portion 11E is a portion where the first counter portion 31A of the first internal electrode layer 31 faces the second counter portion 32A of the second internal electrode layer 32. The counter electrode portion 11E includes a portion of the inner layer portion 11. FIG. 4 illustrates the range of the counter electrode portion 11E in the width direction W and the length direction L. The counter electrode portion 11E is also referred to as the capacitor active portion.

The multilayer body 10 includes lateral surface-side outer layer portions WG. The lateral surface-side outer layer portions WG include a first lateral surface-side outer layer portion WG1 and a second lateral surface-side outer layer portion WG2. The first lateral surface-side outer layer portion WG1 is a portion including the dielectric layers 20 between the counter electrode portion 11E and the first lateral surface WS1. The second lateral surface-side outer layer portion WG2 is a portion including the dielectric layers 20 between the counter electrode portion 11E and the second lateral surface WS2. FIGS. 3 and 4 illustrate the range of the first lateral surface-side outer layer portion WG1 and the second lateral surface-side outer layer portion WG2 in the width direction W. The lateral surface-side outer layer portions are also referred to as W gaps or side gaps.

The multilayer body 10 includes end surface-side outer layer portions LG. The end surface-side outer layer portions LG include a first end surface-side outer layer portion LG1 and a second end surface-side outer layer portion LG2. The first end surface-side outer layer portion LG1 is a portion including the dielectric layers 20 between the counter electrode portion 11E and the first end surface LS1. The second end surface-side outer layer portion LG2 is a portion including the dielectric layers 20 between the counter electrode portion 11E and the second end surface LS2. FIGS. 2 and 4 illustrate the range of the first end surface-side outer layer portion LG1 and the second end surface-side outer layer portion LG2 in the length direction L. The end surface-side outer layer portions are also referred to as L gaps or end gaps.

The external electrodes 40 include a first external electrode 40A on the first end surface LS1 side, and a second external electrode 40B on the second end surface LS2 side.

The first external electrode 40A is provided on the first end surface LS1. The first external electrode 40A is connected to the first internal electrode layer 31. The first external electrode 40A is provided on a portion of the first main surface TS1 and a portion of the second main surface TS2. In the example embodiment, the first external electrode 40A extends from the first end surface LS1 to a portion of the first main surface TS1 and a portion of the second main surface TS2, a portion of the first lateral surface WS1, and a portion of the second lateral surface WS2.

The second external electrode 40B is provided on the second end surface LS2. The second external electrode 40B is connected to the second internal electrode layer 32. The second external electrode 40B is provided on a portion of the first main surface TS1 and a portion of the second main surface TS2. In the present example embodiment, the second external electrode 40B extends from the second end surface LS2 to a portion of the first main surface TS1 and a portion of the second main surface TS2, a portion of the first lateral surface WS1, and a portion of the second lateral surface WS2.

As described above, within the multilayer body 10, the first counter portion 31A of the first internal electrode layer 31 faces the second counter portion 32A of the second internal electrode layer 32, with the dielectric layer 20 being interposed therebetween, thereby generating the capacitance. Therefore, capacitor characteristics are generated between the first external electrode 40A connected to the first internal electrode layer 31, and the second external electrode 40B connected to the second internal electrode layer 32.

The first external electrode 40A includes a first base electrode layer 50A including metal components, a first conductive resin layer 60A on the first base electrode layer 50A, and a first plated layer 70A on the first conductive resin layer 60A. The first plated layer 70A includes a first Ni plated layer 71A as the lower plated layer and a first Sn plated layer 72A as the upper plated layer.

The second external electrode 40B includes a second base electrode layer 50B including metal components, a second conductive resin layer 60B on the second base electrode layer 50B, and a second plated layer 70B on the second conductive resin layer 60B. The second plated layer 70B includes a second Ni plated layer 71B as the lower plated layer and a second Sn plated layer 72B as the upper plated layer.

Here, the basic configuration of the first external electrode 40A and the second external electrode 40B is the same or substantially the same. The first external electrode 40A and the second external electrode 40B are plane-symmetrical or substantially plane-symmetrical with respect to the LW cross section at the center of the multilayer ceramic capacitor 1 in the length direction L. Therefore, unless necessary to distinguish, the first external electrode 40A and the second external electrode 40B may be collectively referred to as the external electrodes 40. Similarly, unless necessary to distinguish, the first base electrode layer 50A and the second base electrode layer 50B may be collectively referred to as the base electrode layers 50. Unless necessary to distinguish, the first conductive resin layer 60A and the second conductive resin layer 60B may be collectively referred to as the conductive resin layers 60. Unless necessary to distinguish, the first plated layer 70A and the second plated layer 70B may be collectively referred to as the plated layers 70. Unless necessary to distinguish, the first Ni plated layer 71A and the second Ni plated layer 71B may be collectively referred to as the Ni plated layers 71. Unless necessary to distinguish, the first Sn plated layer 72A and the second Sn plated layer 72B may be collectively referred to as the Sn plated layers 72.

The base electrode layer 50 includes the first base electrode layer 50A and the second base electrode layer 50B.

The first base electrode layer 50A is provided on the first end surface LS1. The first base electrode layer 50A is connected to the first internal electrode layers 31. In the present example embodiment, the first base electrode layer 50A extends from the first end surface LS1 to a portion of the first main surface TS1, a portion of the second main surface TS2, a portion of the first lateral surface WS1, and a portion of the second lateral surface WS2.

The second base electrode layer 50B is provided on the second end surface LS2. The second base electrode layer 50B is in contact with the second internal electrode layers 32. In the present example embodiment, the second base electrode layer 50B extends from the second end surface LS2 to a portion of the first main surface TS1, a portion of the second main surface TS2, a portion of the first lateral surface WS1, and a portion of the second lateral surface WS2.

The first base electrode layer 50A and the second base electrode layer 50B of the present example embodiment are fired layers. The fired layer preferably includes, for example, a metal component and either a glass component or a ceramic component, or both. This can improve the adhesion between the multilayer body 10 and the base electrode layers. The metal component may include, for example, at least one of Cu, Ni, Ag, Pd, Ag—Pd alloy, or Au. The glass component may include, for example, at least one of B, Si, Ba, Mg, Al, or Li. The glass component being present can aid and promote sintering of the metal components within the base electrode layer. The ceramic component may use the same ceramic material as the dielectric layer 20 or a different type of ceramic material. Examples of the ceramic component include at least one of $BaTiO_3$, $CaTiO_3$, $(Ba,Ca)TiO_3$, $SrTiO_3$, or $CaZrO_3$.

The fired layer, for example, is prepared by applying a conductive paste including glass and metal to the multilayer body, followed by firing. The fired layer may be prepared by simultaneously firing the multilayer chips including internal electrodes and dielectric layers, and the conductive paste applied to the multilayer chips, or may be prepared by obtaining the multilayer body by firing the multilayer chips including internal electrodes and dielectric layers, and then applying the conductive paste to the multilayer body, followed by firing. In the case of simultaneously firing the multilayer chip including internal electrodes and dielectric layers, and the conductive paste applied to the multilayer chip, the fired layer is preferably formed by firing a mixture including ceramic material instead of a glass component. In this case, as the ceramic material to be added, using a ceramic material the same as or similar to the dielectric layer 20 is preferable. The fired layer may include a plurality of layers.

The thickness of the first base electrode layer 50A on the first end surface LS1 in the length direction L is, for example, preferably between about 2 μm and about 220 μm inclusive at the center of the first base electrode layer 50A in the lamination direction T and the width direction W.

The thickness of the second base electrode layer 50B on the second end surface LS2 in the length direction L is, for example, preferably between about 2 μm and about 220 μm inclusive at the center of the second base electrode layer 50B in the lamination direction T and the width direction W.

In cases where the first base electrode layer 50A is also provided on a portion of at least one of the first main surface TS1 or the second main surface TS2, the thickness of the first base electrode layer 50A in this portion in the lamination direction T is, for example, preferably between about 3 μm and about 40 μm inclusive at the center of the first base electrode layer 50A in this portion in the length direction L and the width direction W.

In cases where the first base electrode layer 50A is also provided on a portion of at least one of the first lateral surface WS1 or the second lateral surface WS2, the thickness of the first base electrode layer 50A in this portion in the width direction W is, for example, preferably between about 3 μm and about 40 μm inclusive at the center of the first base electrode layer 50A in this portion in the length direction L and the lamination direction T.

In cases where the second base electrode layer 50B is also provided on a portion of at least one of the first main surface TS1 or the second main surface TS2, the thickness of the second base electrode layer 50B in this portion in the lamination direction T is, for example, preferably between about 3 μm and about 40 μm inclusive at the center of the second base electrode layer 50B in this portion in the length direction L and the width direction W.

In cases where the second base electrode layer 50B is also provided on a portion of at least one of the first lateral surface WS1 or the second lateral surface WS2, the thickness of the second base electrode layer 50B in this portion in the width direction W is, for example, preferably between about 3 μm and about 40 μm inclusive at the center of the second base electrode layer 50B in this portion in the length direction L and the lamination direction T.

The external electrode 40 includes the conductive resin layer 60, which includes resin components and metal components, on the base electrode layer 50.

The conductive resin layer 60 includes the first conductive resin layer 60A and the second conductive resin layer 60B.

The first conductive resin layer 60A covers the first base electrode layer 50A. In the present example embodiment, the first conductive resin layer 60A extends from the first end surface LS1 to a portion of the first main surface TS1 and the second main surface TS2, and a portion of the first lateral surface WS1 and the second lateral surface WS2. The second conductive resin layer 60B covers the second base electrode layer 50B. In the present example embodiment, the second conductive resin layer 60B extends from the second end surface LS2 to a portion of the first main surface TS1 and the second main surface TS2, and a portion of the first lateral surface WS1 and the second lateral surface WS2. The dimension of the first conductive resin layer 60A on the first main surface TS1 and the second main surface TS2 in the length direction L is longer than the dimension of the first base electrode layer 50A on the first main surface TS1 and the second main surface TS2 in the length direction L. The dimension of the second conductive resin layer 60B on the first main surface TS1 and the second main surface TS2 in the length direction L is longer than the dimension of the second base electrode layer 50B on the first main surface TS1 and the second main surface TS2 in the length direction L.

The thickness of the first conductive resin layer 60A on the first end surface LS1 side in the length direction L is, for example, preferably between about 5 µm and about 200 µm inclusive at the central portion of the first conductive resin layer 60A in the lamination direction T and width direction W.

The thickness of the second conductive resin layer 60B on the second end surface LS2 side in the length direction L is, for example, preferably between about 5 µm and about 200 µm inclusive at the central portion of the second conductive resin layer 60B in the lamination direction T and width direction W.

In the case where the first conductive resin layer 60A is also provided on a portion of the first main surface TS1 side and part of the second main surface TS2 side, the thickness of the first conductive resin layer 60A in this portion in the lamination direction T is, for example, preferably between about 5 µm and about 200 µm inclusive at the central portion of the first conductive resin layer 60A in the length direction L and width direction W.

In the case where the first conductive resin layer 60A is also provided on a portion of the first lateral surface WS1 side and part of the second lateral surface WS2 side, the thickness of the first conductive resin layer 60A in this portion in the width direction is, for example, preferably between about 5 µm and about 200 µm inclusive at the central portion of the first conductive resin layer 60A in the length direction L and lamination direction T.

In the case where the second conductive resin layer 60B is also provided on a portion of the first main surface TS1 side and part of the second main surface TS2 side, the thickness of the second conductive resin layer 60B in this portion in the lamination direction T is, for example, preferably between about 5 µm and about 200 µm inclusive at the central portion of the second conductive resin layer 60B in the length direction L and width direction W.

In the case where the second conductive resin layer 60B is also provided on a portion of the first lateral surface WS1 side and part of the second lateral surface WS2 side, the thickness of the second conductive resin layer 60B in this portion in the width direction is, for example, preferably between about 5 µm and about 200 µm inclusive, at the central portion of the second conductive resin layer 60B in the length direction L and lamination direction T.

The conductive resin layer 60 is provided on the base electrode layer 50. The plated layer 70 covers the conductive resin layer 60. The plated layer 70 includes, for example, the Ni plated layer 71 and the Sn plated layer 72.

The conductive resin layer 60 includes a resin portion as resin components, and conductive fillers as filler particles dispersed within the resin portion.

The resin portion of the conductive resin layer 60 may include at least one of various known thermosetting resins such as epoxy resin, phenoxy resin, phenol resin, urethane resin, silicone resin, polyimide resin, etc. Among these, epoxy resin, which has excellent heat resistance, moisture resistance, and adhesiveness, is a suitable resin. The resin portion of the conductive resin layer 60 preferably includes a curing agent, along with the thermosetting resin. In the case of using epoxy resin as the base resin, the curing agent for the epoxy resin may be various known compounds such as, for example, phenolic, amine, anhydride, imidazole, active ester, and amide-imide compounds.

The conductive resin layer 60, including such a resin portion, is more flexible than the base electrode layer 50 made of a plating film or a fired material of metal components and glass components. Therefore, the conductive resin layer 60 defines and functions as a buffering layer even when the multilayer ceramic capacitor 1 is subjected to physical shock or thermal-cycling shock. Thus, the conductive resin layer 60 reduces or prevents the occurrence of cracks in the multilayer ceramic capacitor 1.

The conductive fillers are dispersed uniformly or substantially uniformly within the resin portion. The conductive fillers primarily ensure the conductivity of the conductive resin layer 60. Specifically, contact between a plurality of conductive fillers provides conductive pathways within the conductive resin layer 60, ensuring electrical conductivity between the base electrode layer 50 and the plated layer 70.

The metal of the conductive filler may be, for example, pure Ag, an alloy including Ag, or metal powders coated with Ag on their surface. Ag, the resistivity of which is the lowest among metals, is suitable as an electrode material. Being a noble metal, Ag is less prone to oxidation and exhibits high weather resistance. Therefore, Ag metal powders are suitable as conductive fillers. When using metal powders coated with Ag on their surface, it is preferable to use, for example, Cu, Ni, Sn, Bi, or alloy powders thereof.

The conductive fillers may be, for example, Cu or Ni subjected to an antioxidation treatment. The conductive fillers may also be metal powders coated with, for example, Sn, Ni, Cu on their surface. When using metal powders coated with Sn, Ni, Cu on their surface, the metal powders are preferably, for example, Ag, Cu, Ni, Sn, Bi, or alloys thereof. The conductive fillers preferably include, for example, a core of Cu particles. At least a portion of the surface of the Cu particles is preferably coated with, for example, a Cu—Ag alloy of Cu and Ag. At least a portion of the surface of the Cu particles may be coated with Ag. This improves the affinity with Ni plating and enhances electrical properties.

The shape of the conductive fillers is not particularly limited. The shape of the conductive fillers can be spherical, flat, etc. It is preferable to use a mixture of spherical and flat metal powders. In other words, the conductive fillers as filler powders include flat powders or spherical powders.

The average particle size of the conductive fillers may be, for example, between about 0.3 µm and about 10 µm inclusive.

A method of measuring the average particle size of the conductive fillers included in the conductive resin layer 60 is calculated using a laser diffraction particle size measurement method, based on ISO 13320, instead of the shape of the conductive fillers.

The plated layer 70 includes the first plated layer 70A and the second plated layer 70B.

The first plated layer 70A covers the first conductive resin layer 60A. In the present example embodiment, the first plated layer 70A extends from the first end surface LS1 to a portion of the first main surface TS1 and the second main surface TS2, and a portion of the first lateral surface WS1 and the second lateral surface WS2.

The second plated layer 70B covers the second conductive resin layer 60B. In the present example embodiment, the second plated layer 70B extends from the first end surface LS1 to a portion of the first main surface TS1 and the second main surface TS2, and a portion of the first lateral surface WS1 and the second lateral surface WS2.

The plated layer 70 preferably includes a two-layer structure including, for example, the Ni plated layer 71 and the Sn plated layer 72. The first Sn plated layer 72A is preferably provided on the first Ni plated layer 71A, and the second Sn plated layer 72B is preferably provided on the second Ni plated layer 71B. The Ni plated layer 71 prevents the base electrode layer 50 and the conductive resin layer 60 from being eroded by solder when mounting the multilayer ceramic capacitor 1. The Sn plated layer 72 improves the solder wettability when mounting the multilayer ceramic capacitor 1. This facilitates the mounting process of the multilayer ceramic capacitor 1.

The thickness of the first Ni plated layer 71A and the first Sn plated layer 72A is, for example, preferably between about 1 μm and about 15 μm inclusive.

The thickness of the second Ni plated layer 71B and the second Sn plated layer 72B is, for example, preferably between about 1 μm and about 15 μm inclusive.

The basic configuration of the multilayer ceramic capacitor 1 according to the present example embodiment has been described above. The dimension of the multilayer ceramic capacitor 1 including the multilayer body 10 and the external electrodes 40 in the length direction L, denoted as the L dimension, is, for example, preferably between about 0.2 mm and about 10 mm inclusive. The dimension of the multilayer ceramic capacitor 1 in the lamination direction T, denoted as the T dimension, is, for example, preferably between about 0.05 mm and about 10 mm inclusive. The dimension of the multilayer ceramic capacitor 1 in the width direction W, denoted as the W dimension, is, for example, preferably between about 0.1 mm and about 10 mm inclusive.

The multilayer ceramic capacitor 1 of the present example embodiment including the basic configuration has the following characteristics in the external electrodes 40, which is the first external electrode 40A and the second external electrode 40B.

The external electrodes 40 of the present example embodiment include the main surface-side external electrodes on at least one of the first main surface TS1 or the second main surface TS2. Specifically, as described above, the first external electrode 40A of the present example embodiment is provided on the first end surface LS1 and extends from the first end surface LS1 to a portion of the first main surface TS1, a portion of the second main surface TS2, a portion of the first lateral surface WS1, and a portion of the second lateral surface WS2. The first external electrode 40A of the present example embodiment includes a first end surface-side external electrode 400A as an end surface-side external electrode on the first end surface LS1, a first main surface-side external electrode 411A as a main surface-side external electrode on the first main surface TS1, a second main surface-side external electrode 412A as a main surface-side external electrode on the second main surface TS2, as illustrated in FIGS. 2 and 4, a first lateral surface-side external electrode 421A on the first lateral surface WS1, and a second lateral surface-side external electrode 422A on the second lateral surface WS2, as illustrated in FIG. 4.

As described earlier, the first external electrode 40A includes the first base electrode layer 50A, the first conductive resin layer 60A on the first base electrode layer 50A, and the first plated layer 70A on the first conductive resin layer 60A. In the present example embodiment, the first base electrode layer 50A extends from the first end surface LS1 to a portion of the first main surface TS1 and the second main surface TS2, and a portion of the first lateral surface WS1 and the second lateral surface WS2. The first conductive resin layer 60A covers the first base electrode layer 50A, and the first plated layer 70A covers the first conductive resin layer 60A.

In other words, as illustrated in FIGS. 2 and 4, the first end surface-side external electrode 400A of the present example embodiment includes the first end surface-side base electrode layer 500A on the first end surface LS1, the first end surface-side conductive resin layer 600A above the first end surface-side base electrode layer 500A, and the first end surface-side plated layer 700A above the first end surface-side conductive resin layer 600A. The first end surface-side base electrode layer 500A is a portion of the first base electrode layer 50A. The first end surface-side conductive resin layer 600A is a portion of the first conductive resin layer 60A. The first end surface-side plated layer 700A is a portion of the first plated layer 70A, and includes the first Ni plated layer 71A and the first Sn plated layer 72A on the first Ni plated layer 71A.

As illustrated in FIG. 2, the first main surface-side external electrode 411A of the present example embodiment includes the first main surface-side base electrode layer 511A as the main surface-side base electrode layer on the first main surface TS1, the first main surface-side conductive resin layer 611A as the main surface-side conductive resin layer above the first main surface-side base electrode layer 511A, and the first main surface-side plated layer 711A as the main surface-side plated layer above the first main surface-side conductive resin layer 611A. The first main surface-side base electrode layer 511A is a portion of the first base electrode layer 50A. The first main surface-side conductive resin layer 611A is a portion of the first conductive resin layer 60A. The first main surface-side plated layer 711A, a portion of the first plated layer 70A, and includes the first Ni plated layer 71A and the first Sn plated layer 72A on the first Ni plated layer 71A.

As illustrated in FIG. 2, the second main surface-side external electrode 412A of the present example embodiment includes the second main surface-side base electrode layer 512A as the main surface-side base electrode layer on the second main surface TS2, the second main surface-side conductive resin layer 612A as the main surface-side conductive resin layer above the second main surface-side base electrode layer 512A, and the second main surface-side plated layer 712A as the main surface-side plated layer above the second main surface-side conductive resin layer 612A. The second main surface-side base electrode layer 512A is a portion of the first base electrode layer 50A. The second main surface-side conductive resin layer 612A is a portion of the first conductive resin layer 60A. The second main surface-side plated layer 712A is a portion of the first plated layer 70A, and includes the first Ni plated layer 71A and the first Sn plated layer 72A on the first Ni plated layer 71A.

As illustrated in FIG. 4, the first lateral surface-side external electrode 421A of the present example embodiment includes the first lateral surface-side base electrode layer 521A on the first lateral surface WS1, the first lateral surface-side conductive resin layer 621A above the first lateral surface-side base electrode layer 521A, and the first lateral surface-side plated layer 721A above the first lateral surface-side conductive resin layer 621A. The first lateral surface-side base electrode layer 521A is part of the first base electrode layer 50A. The first lateral surface-side conductive resin layer 621A is a portion of the first conductive resin layer 60A. The first lateral surface-side plated layer 721A is a portion of the first plated layer 70A, and includes the first Ni plated layer 71A and the first Sn plated layer 72A on the first Ni plated layer 71A.

As illustrated in FIG. 4, the second lateral surface-side external electrode 422A of the present example embodiment includes the second lateral surface-side base electrode layer 522A on the second lateral surface WS2, the second lateral surface-side conductive resin layer 622A above the second lateral surface-side base electrode layer 522A, and the second lateral surface-side plated layer 722A above the second lateral surface-side conductive resin layer 622A. The second lateral surface-side base electrode layer 522A is a portion of the first base electrode layer 50A. The second lateral surface-side conductive resin layer 622A is a portion of the first conductive resin layer 60A. The second lateral surface-side plated layer 722A is a portion of the first plated layer 70A, and includes the first Ni plated layer 71A and the first Sn plated layer 72A on the first Ni plated layer 71A.

The thickness of the first main surface-side base electrode layer 511A, the second main surface-side base electrode layer 512A, the first lateral surface-side base electrode layer 521A, and the second lateral surface-side base electrode layer 522A is, for example, preferably between about 5 μm and about 10 μm inclusive.

The thickness of the first Ni plated layer 71A and the first Sn plated layer 72A, in the first main surface-side plated layer 711A, the second main surface-side plated layer 712A, the first lateral surface-side plated layer 721A, and the second lateral surface-side plated layer 722A, is, for example, preferably between about 1 μm and about 4 μm inclusive.

As described above, the second external electrode 40B of the present example embodiment is provided on the second end surface LS2 and extends from the second end surface LS2 to a portion of the first main surface TS1, a portion of the second main surface TS2, a portion of the first lateral surface WS1, and a portion of the second lateral surface WS2. Specifically, the second external electrode 40B of the present example embodiment includes a second end surface-side external electrode 400B as an end surface-side external electrode on the second end surface LS1, a first main surface-side external electrode 411B as a main surface-side external electrode on the first main surface TS1, a second main surface-side external electrode 412B as a main surface-side external electrode on the second main surface TS2, as illustrated in FIG. 2, a first lateral surface-side external electrode 421B on the first lateral surface WS1, and a second lateral surface-side external electrode 422B on the second lateral surface WS2, as illustrated in FIG. 4.

As described earlier, the second external electrode 40B includes the second base electrode layer 50B, the second conductive resin layer 60B on the second base electrode layer 50B, and the second plated layer 70B on the second conductive resin layer 60B. In the present example embodiment, the second base electrode layer 50B extends from the second end surface LS2 to a portion of the first main surface TS1 and the second main surface TS2, and a portion of the first lateral surface WS1 and the second lateral surface WS2. The second conductive resin layer 60B covers the second base electrode layer 50B, and the second plated layer 70B covers the second conductive resin layer 60B.

In other words, as illustrated in FIGS. 2 and 4, the second end surface-side external electrode 400B of the present example embodiment includes the second end surface-side base electrode layer 500B on the second end surface LS2, the second end surface-side conductive resin layer 600B above the second end surface-side base electrode layer 500B, and the second end surface-side plated layer 700B above the second end surface-side conductive resin layer 600B. The second end surface-side base electrode layer 500B is a portion of the second base electrode layer 50B. The second end surface-side conductive resin layer 600B is a portion of the second conductive resin layer 60B. The second end surface-side plated layer 700B is a portion of the second plated layer 70B, and includes the second Ni plated layer 71B and the second Sn plated layer 72B on the second Ni plated layer 71B.

As illustrated in FIG. 2, the first main surface-side external electrode 411B of the present example embodiment includes the first main surface-side base electrode layer 511B as the main surface-side base electrode layer on the first main surface TS1, the first main surface-side conductive resin layer 611B as the main surface-side conductive resin layer above the first main surface-side base electrode layer 511B, and the first main surface-side plated layer 711B as the main surface-side plated layer above the first main surface-side conductive resin layer 611B. The first main surface-side base electrode layer 511B is a portion of the second base electrode layer 50B. The first main surface-side conductive resin layer 611B is a portion of the second conductive resin layer 60B. The first main surface-side plated layer 711B is a portion of the second plated layer 70B, and includes the second Ni plated layer 71B and the second Sn plated layer 72B on the second Ni plated layer 71B.

As illustrated in FIG. 2, the second main surface-side external electrode 412B of the present example embodiment includes the second main surface-side base electrode layer 512B as the main surface-side base electrode layer on the second main surface TS2, the second main surface-side conductive resin layer 612B as the main surface-side conductive resin layer above the second main surface-side base electrode layer 512B, and the second main surface-side plated layer 712B as the main surface-side plated layer above the second main surface-side conductive resin layer 612B. The second main surface-side base electrode layer 512B is a portion of the second base electrode layer 50B. The second main surface-side conductive resin layer 612B is a portion of the second conductive resin layer 60B. The second main surface-side plated layer 712B is a portion of the second plated layer 70B, and includes the second Ni plated layer 71B and the second Sn plated layer 72B on the second Ni plated layer 71B.

As illustrated in FIG. 4, the first lateral surface-side external electrode 421B of the present example embodiment includes the first lateral surface-side base electrode layer 521B on the first lateral surface WS1, the first lateral surface-side conductive resin layer 621B above the first lateral surface-side base electrode layer 521B, and the first lateral surface-side plated layer 721B above the first lateral surface-side conductive resin layer 621B. The first lateral surface-side base electrode layer 521B is a portion of the second base electrode layer 50B. The first lateral surface-side conductive resin layer 621B is a portion of the second conductive resin layer 60B. The first lateral surface-side plated layer 721B is a portion of the second plated layer 70B, and includes the second Ni plated layer 71B and the second Sn plated layer 72B on the second Ni plated layer 71B.

As illustrated in FIG. 4, the second lateral surface-side external electrode 422B of the present example embodiment includes the second lateral surface-side base electrode layer 522B on the second lateral surface WS2, the second lateral surface-side conductive resin layer 622B above the second lateral surface-side base electrode layer 522B, and the second lateral surface-side plated layer 722B above the second lateral surface-side conductive resin layer 622B. The second lateral surface-side base electrode layer 522B is portion of the second base electrode layer 50B. The second lateral surface-side conductive resin layer 622B is a portion of the second conductive resin layer 60B. The second lateral surface-side plated layer 722B is a portion of the second plated layer 70B, and includes the second Ni plated layer 71B and the second Sn plated layer 72B on the second Ni plated layer 71B.

The thickness of the first main surface-side base electrode layer 511B, the second main surface-side base electrode layer 512B, the first lateral surface-side base electrode layer 521B, and the second lateral surface-side base electrode layer 522B, is, for example, preferably between about 5 μm and about 10 μm inclusive.

The thickness of the second Ni plated layer 71B and the second Sn plated layer 72B of the first main surface-side plated layer 711B, the second main surface-side plated layer 712B, the first lateral surface-side plated layer 721B, and the second lateral surface-side plated layer 722B is preferably, for example, between about 1 μm and about 4 μm inclusive.

FIG. 2 illustrates the LT cross section of the multilayer ceramic capacitor 1 and the multilayer body 10 along the lamination direction T and the length direction L. In the LT cross-sectional view, the first main surface-side external electrode 411A of the first external electrode 40A includes a first main surface-side recess 510A as a recess recessed towards the multilayer body 10 side. The first main surface-side recess 510A is provided on the surface of the first main surface-side external electrode 411A. The shape of the first main surface-side recess 510A is a groove extending in the width direction W orthogonal or substantially orthogonal to the LT cross section, i.e., in the direction perpendicular to the paper surface of FIG. 2. The first main surface-side recess 510A may be provided over the entire length of the first main surface-side external electrode 411A along the width direction W. The first main surface-side recess 510A is provided near the approximate center of the first main surface-side external electrode 411A in the length direction L.

As illustrated in FIG. 2, the second main surface-side external electrode 412A of the first external electrode 40A includes a second main surface-side recess 520A as a recess recessed towards the multilayer body 10 side in the LT cross-sectional view. The second main surface-side recess 520A is provided on the surface of the second main surface-side external electrode 412A. The shape of the second main surface-side recess 520A is a groove extending in the width direction W orthogonal or substantially orthogonal to the LT cross section, i.e., in the direction perpendicular to the paper surface of FIG. 2. The second main surface-side recess 520A may be provided over the entire length of the second main surface-side external electrode 412A along the width direction W. The second main surface-side recess 520A is provided near the approximate center of the second main surface-side external electrode 412A in the length direction L.

As illustrated in FIG. 2, the first main surface-side external electrode 411B of the second external electrode 40B includes a first main surface-side recess 510B as a recess recessed towards the multilayer body 10 side in the LT cross-sectional view. The first main surface-side recess 510B is provided on the surface of the first main surface-side external electrode 411B. The shape of the first main surface-side recess 510B is a groove extending in the width direction W orthogonal or substantially orthogonal to the LT cross section, i.e., in the direction perpendicular to the paper surface of FIG. 2. The first main surface-side recess 510B may be provided over the entire length of the first main surface-side external electrode 411B along the width direction W. The first main surface-side recess 510B is provided near the approximate center of the first main surface-side external electrode 411B in the length direction L.

As illustrated in FIG. 2, the second main surface-side external electrode 412B of the second external electrode 40B includes a second main surface-side recess 520B as a recess recessed towards the multilayer body 10 side in the LT cross-sectional view. The second main surface-side recess 520B is provided on the surface of the second main surface-side external electrode 412B. The shape of the second main surface-side recess 520B is a groove extending in the width direction W orthogonal or substantially orthogonal to the LT cross section, i.e., in the direction perpendicular to the paper surface of FIG. 2. The second main surface-side recess 520B may be provided over the entire or substantially the entire length of the second main surface-side external electrode 412B along the width direction W. The second main surface-side recess 520B is provided near the approximate center of the second main surface-side external electrode 412B in the length direction L.

FIG. 4 illustrates an LW cross section of the multilayer ceramic capacitor 1 and the multilayer body 10 along the length direction L and the width direction W. In the LW cross-sectional views, the first lateral surface-side external electrode 421A of the first external electrode 40A includes a first lateral surface-side recess 530A as a recess recessed towards the multilayer body 10 side. The first lateral surface-side recess 530A is provided on the surface of the first lateral surface-side external electrode 421A. The shape of the first lateral surface-side recess 530A is a groove extending in the lamination direction T orthogonal or substantially orthogonal to the LW cross section, i.e., in the direction perpendicular to the paper surface of FIG. 4. The first lateral surface-side recess 530A may be provided over the entire or substantially the entire length of the first lateral surface-side external electrode 421A along the lamination direction T. The first lateral surface-side recess 530A is provided near the approximate center of the first lateral surface-side external electrode 421A in the length direction L. The first lateral surface-side recess 530A may communicate with either or both of the first main surface-side recess 510A and the second main surface-side recess 520A, or may not communicate with both.

As illustrated in FIG. 4, the second lateral surface-side external electrode 422A of the first external electrode 40A includes a second lateral surface-side recess 540A as a recess recessed towards the multilayer body 10 side in the LW cross-sectional view. The second lateral surface-side recess 540A is provided on the surface of the second lateral surface-side external electrode 422A. The shape of the second lateral surface-side recess 540A is a groove extending in the lamination direction T orthogonal or substantially orthogonal to the LW cross section, i.e., in the direction perpendicular to the paper surface of FIG. 4. The second lateral surface-side recess 540A may be provided over the entire or substantially the entire length of the second lateral surface-side external electrode 422A along the lamination direction T. The second lateral surface-side recess 540A is provided near the approximate center of the second lateral surface-side external electrode 422A in the length direction L. The second lateral surface-side recess 540A may communicate with either or both of the first main surface-side recess 510A and the second main surface-side recess 520A, or may not communicate with both.

As illustrated in FIG. 4, the first lateral surface-side external electrode 421B of the second external electrode 40B includes a first lateral surface-side recess 530B as a recess recessed towards the multilayer body 10 side in the LW cross-sectional view. The first lateral surface-side recess 530B is provided on the surface of the first lateral surface-side external electrode 421B. The shape of the first lateral surface-side recess 530B is a groove extending in the lamination direction T orthogonal or substantially orthogonal to the LW cross section, i.e., in the direction perpendicular to the paper surface of FIG. 4. The first lateral surface-side recess 530B may be provided over the entire or substantially the entire length of the first lateral surface-side external electrode 421B along the lamination direction T. The first lateral surface-side recess 530B is provided near the approximate center of the first lateral surface-side external electrode 421B in the length direction L. The first lateral surface-side recess 530B may communicate with either or both of the first main surface-side recess 510B and the second main surface-side recess 520B, or may not communicate with both.

As illustrated in FIG. 4, the second lateral surface-side external electrode 422B of the second external electrode 40B includes a second lateral surface-side recess 540B as a recess recessed towards the multilayer body 10 side in the LW cross-sectional view. The second lateral surface-side recess 540B is provided on the surface of the second lateral surface-side external electrode 422B. The shape of the second lateral surface-side recess 540B is a groove extending in the lamination direction T orthogonal or substantially orthogonal to the LW cross section, i.e., in the direction perpendicular or substantially perpendicular to the paper surface of FIG. 4. The second lateral surface-side recess 540B may be provided over the entire or substantially the entire length of the second lateral surface-side external electrode 422B along the lamination direction T. The second lateral surface-side recess 540B is provided near the approximate center of the second lateral surface-side external electrode 422B in the length direction L. The second lateral surface-side recess 540B may communicate with either or both of the first main surface-side recess 510B and the second main surface-side recess 520B, or may not communicate with both.

The first main surface-side external electrode 411A and the second main surface-side external electrode 412A of the first external electrode 40A, as well as the first main surface-side external electrode 411B and the second main surface-side external electrode 412B of the second external electrode 40B, share the same or substantially the same configuration. Similarly, the first lateral surface-side external electrode 421A and the second lateral surface-side external electrode 422A of the first external electrode 40A, as well as the first lateral surface-side external electrode 421B and the second lateral surface-side external electrode 422B of the second external electrode 40B, also share the same or substantially the same configuration as the four main surface-side external electrodes 411A, 412A, 411B, and 412B.

The first main surface-side recess 510A and the second main surface-side recess 520A of the first external electrode 40A, as well as the first main surface-side recesses 510B and the second main surface-side recesses 520B of the second external electrode 40B, share the same or substantially the same configuration. Similarly, the first lateral surface-side recess 530A and the second lateral surface-side recess 540A of the first external electrode 40A, as well as the first lateral surface-side recess 530B and the second lateral surface-side recess 540B of the second external electrode 40B, also share the same or substantially the same configuration as the four main surface-side recesses 510A, 520A, 510B, and 520B.

Accordingly, the first main surface-side external electrode 411A and the first main surface-side recess 510A of the first external electrode 40A will be described below, representatively describing the four main surface-side external electrodes, the four main surface-side recesses, the four lateral surface-side external electrodes, and the four lateral surface-side recesses.

The first main surface-side external electrode 411A of the first external electrode 40A corresponds to the second main surface-side external electrode 412A, the first lateral surface-side external electrode 421A, and the second lateral surface-side external electrode 422A of the first external electrode 40A, as well as the first main surface-side external electrode 411B, the second main surface-side external electrode 412B, the first lateral surface-side external electrode 421B, and the second lateral surface-side external electrode 422B of the second external electrode 40B. The first main surface-side recess 510A of the first external electrode 40A corresponds to the second main surface-side recess 520A, the first lateral surface-side recess 530A, and the second lateral surface-side recess 540A of the first external electrode 40A, as well as the first main surface-side recesses 510B, the second main surface-side recesses 520B, the first lateral surface-side recess 530B, and the second lateral surface-side recess 540B of the second external electrode 40B.

The first base electrode layer 50A, the first conductive resin layer 60A, and the first plated layer 70A of the first external electrode 40A correspond to the second base electrode layer 50B, the second conductive resin layer 60B, and the second plated layer 70B of the second external electrode 40B, respectively. The first Ni plated layer 71A and the first Sn plated layer 72A of the first plated layer 70A of the first external electrode 40A correspond to the second Ni plated layer 71B and the second Sn plated layer 72B of the second plated layer 70B of the second external electrode 40B, respectively.

Figure 5A:
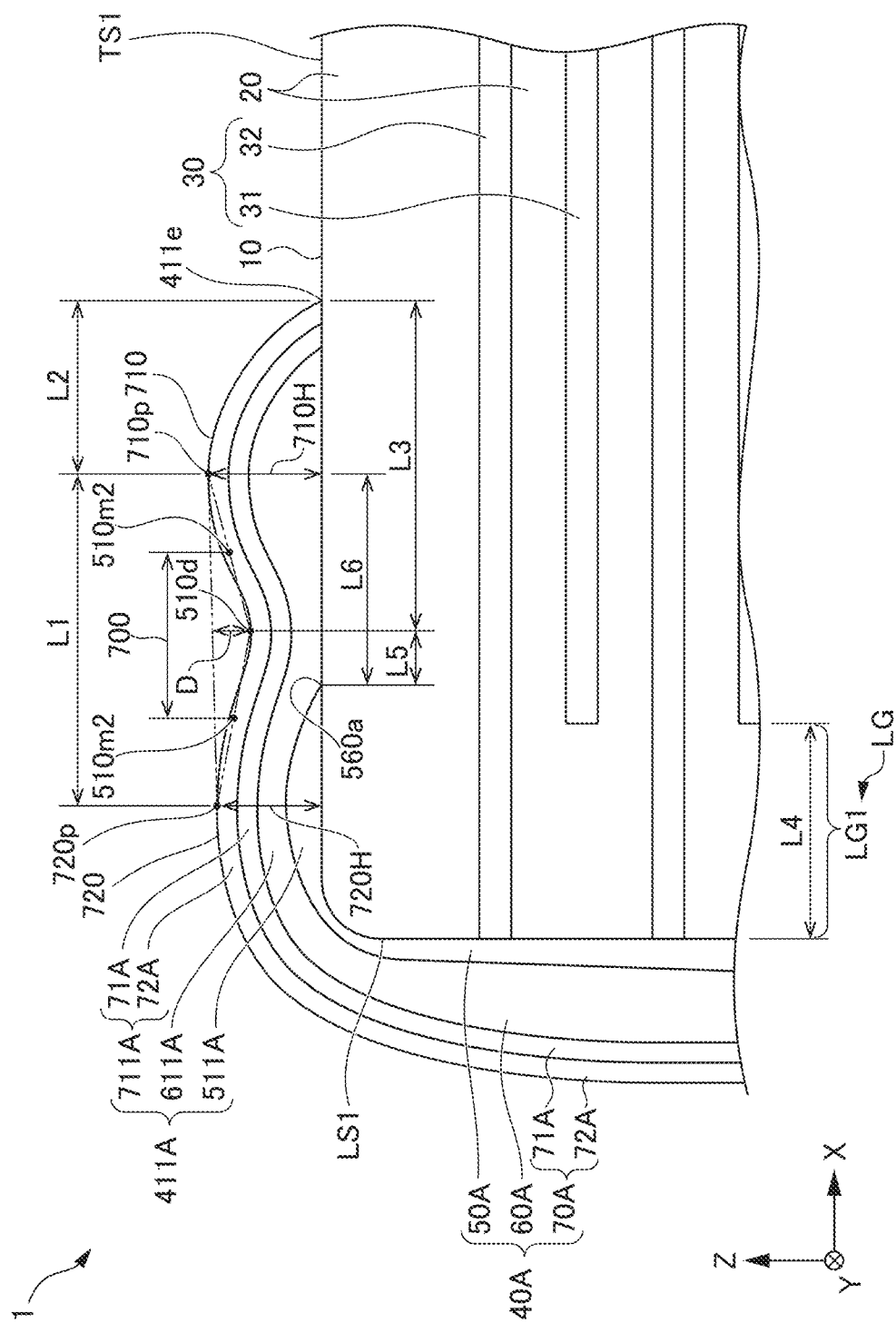
FIG. 5A is an enlarged view of the portion indicated by V in FIG. 2, illustrating a cross section of the first main surface-side external electrode.
Figure 5B:
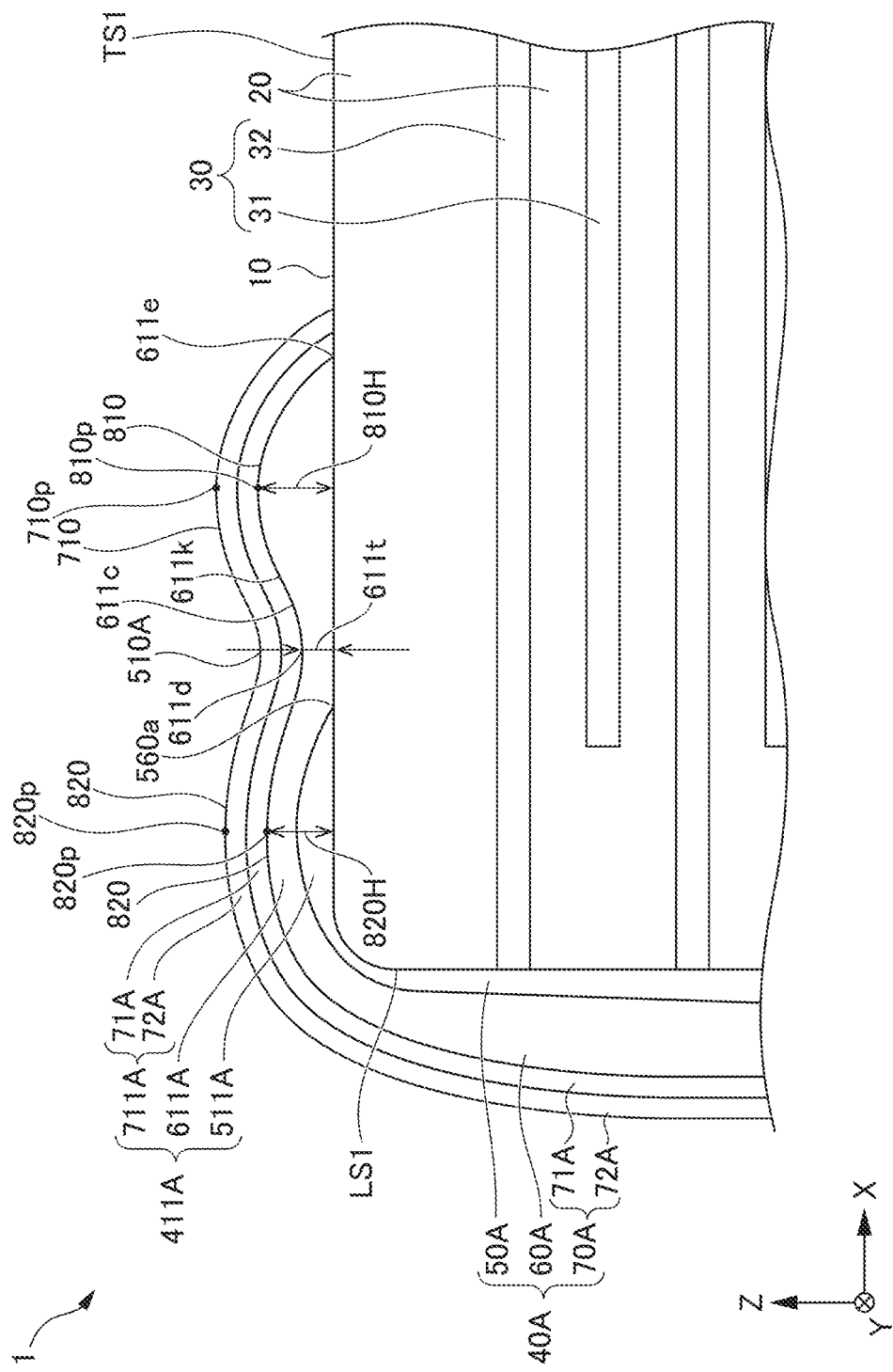
FIG. 5B is an enlarged view of the portion indicated by V in FIG. 2, illustrating a cross section of the first main surface-side external electrode.

FIGS. 5A and 5B are both enlarged views of the portion indicated by V in FIG. 2, illustrating the LT cross-sectional view of the first main surface-side external electrode 411A of the first external electrode 40A. FIGS. 5A and 5B illustrate the XYZ orthogonal coordinate system similar to that in FIGS. 1 to 4. In FIGS. 5A and 5B, hatching is omitted to clearly illustrate symbols, leader lines, and dimension lines.

As illustrated in FIGS. 5A and 5B, the first main surface-side external electrode 411A of the first external electrode 40A includes the first main surface-side base electrode layer 511A on the first main surface TS1 and the first main surface-side conductive resin layer 611A, and the first main surface-side plated layer 711A including the first Ni plated layer 71A and the first Sn plated layer 72A. The first main surface-side recess 510A is formed by the three layers being recessed towards the multilayer body 10 side in the lamination direction T (the Z direction in FIGS. 5A and 5B), in which the three layers include the outermost first Sn plated layer 72A, the first Ni plated layer 71A beneath the first Sn plated layer 72A, and the first main surface-side conductive resin layer 611A beneath the first Ni plated layer 71A.

As illustrated in FIGS. 5A and 5B, the surface of the first main surface-side external electrode 411A includes the first main surface-side recess 510A, and also includes a first bulge 710 and a second bulge 720. The first bulge 710 is provided on the inner side of the first main surface-side recess 510A in the length direction L, i.e., on the central side of the multilayer body 10 in the length direction L (away from the first end surface LS1 in the length direction L). The second bulge 720 is provided on the outer side of the first main surface-side recess 510A in the length direction L, i.e., on the outer side of the multilayer body 10 in the length direction L (closer to the first end surface LS1 in the length direction L). In other words, the first main surface-side external electrode 411A includes the first main surface-side recess 510A, as well as the first bulge 710 on the central side of the multilayer body 10 in the length direction L, and the second bulge 720 on the end portion side of the multilayer body 10 in the length direction L, between which the first main surface-side recess 510A is interposed.

The reference number 700 in FIG. 5A represents a region of the first main surface-side recess 510A in the length direction L, in the example embodiment. The region 700 of the first main surface-side recess 510A in the length direction L is based on the distance in the length direction L between a first midpoint 510m1, which connects a deepest portion 510d of the first main surface-side recess 510A to a vertex 710p of the first bulge 710, and a second midpoint 510m2, which connects the deepest portion 510d of the first main surface-side recess 510A to a vertex 720p of the second bulge 720. The deepest portion 510d of the first main surface-side recess 510A refers to the portion closest to the first main surface TS1 of the multilayer body 10 in the lamination direction T, in the first main surface-side recess 510A. The vertex 710p of the first bulge 710 is the point farthest from the first main surface TS1 of the multilayer body 10 in the lamination direction T, on the surface of the first bulge 710. The vertex 720p of the second bulge 720 is the point farthest from the first main surface TS1 of the multilayer body 10 in the lamination direction T, on the surface of the second bulge 720.

The distance between the vertex 710p of the first bulge 710 and the first main surface TS1 of the multilayer body 10 in the lamination direction T is the height 710H of the first bulge 710. The distance between the vertex 720p of the second bulge 720 and the first main surface TS1 of the multilayer body 10 in the lamination direction T is the height 720H of the second bulge 720.

In the example embodiment, the height 710H of the first bulge 710 is preferably higher than the height 720H of the second bulge 720. The height 710H of the first bulge 710 and the height 720H of the second bulge 720 may be the same or different. In the cases of being different, the height 710H of the first bulge 710 may be higher or lower than the height 720H of the second bulge 720.

In the present example embodiment, the depth D of the first main surface-side recess 510A refers to the shortest distance between the deepest portion 510d and the line connecting the vertex 710p of the first bulge 710 and the vertex 720p of the second bulge 720.

In the present example embodiment, the depth D of the first main surface-side recess 510A is, for example, preferably between about 3 μm and about 10 μm inclusive.

In the present example embodiment, the depth D of the first main surface-side recess 510A is preferably greater than the thickness of the Ni plated layer 71A in the lamination direction T, in the first main surface-side external electrode 411A.

As illustrated in FIG. 5A, in the present example embodiment, the distance L1 between the vertex 710p of the first bulge 710 and the vertex 720p of the second bulge 720 in the length direction L is, for example, preferably between about 100 μm and about 400 μm inclusive.

As illustrated in FIG. 5A, the distance L1 is preferably longer than the distance L2 between the inner end portion 411e of the first main surface-side external electrode 411A in the length direction L and the vertex 710p of the first bulge 710 in the length direction L.

FIG. 2 illustrates the length L4 of the end surface-side outer layer portion LG (first end surface-side outer layer portion LG1, second end surface-side outer layer portion LG2) of the multilayer body 10 in the length direction L. FIG. 5A illustrates the length L4 of the first end surface-side outer layer portion LG1 in the length direction L. In the present example embodiment, the distance L1 between the vertex 710p of the first bulge 710 and the vertex 720p of the second bulge 720 in the length direction L is preferably longer than the length L4 of the first end surface-side outer layer portion LG1 of the multilayer body 10 in the length direction L.

The distance L1 is preferably greater than the maximum thickness of the first main surface-side external electrode 411A in the lamination direction T. The distance L1 is preferably greater than the maximum thickness of the first main surface-side conductive resin layer 611A in the lamination direction T. The distance L1 is preferably greater than the maximum thickness of the first main surface-side base electrode layer 511A in the lamination direction T.

As illustrated in FIG. 5A, the distance L3 between the inner end portion 411e of the first main surface-side external electrode 411A in the length direction L and the deepest portion 510d of the first main surface-side recess 510A in the length direction L is preferably longer than the length L4 of the end surface-side outer layer portion LG of the multilayer body 10 in the length direction L. The distance L3 is, for example, preferably at least about 300 μm.

In the present example embodiment, the depth D of the first main surface-side recess 510A is, for example, preferably between about 5% and about 15% inclusive, of the maximum thickness of the first main surface-side external electrode 411A in the lamination direction T.

As illustrated in FIG. 5A, in the present example embodiment, the distance L5 between the inner end portion 560a of the first main surface-side base electrode layer 511A and the deepest portion 510d of the first main surface-side recess 510A in the length direction L is, for example, preferably between about 15 μm and about 150 μm inclusive.

As illustrated in FIG. 5A, in the present example embodiment, the distance L6 between the inner end portion 560a of the first main surface-side base electrode layer 511A and the vertex 710p of the first bulge 710 in the length direction L is, for example, preferably between about 100 μm and about 300 μm inclusive.

The first main surface-side recess 510A includes the three layers being recessed towards the multilayer body 10 side in the lamination direction T, in which the three layers include the outermost first Sn plated layer 72A, the first Ni plated layer 71A beneath the first Sn plated layer 72A, and the first main surface-side conductive resin layer 611A beneath the first Ni plated layer 71A. That is, the first main surface-side base electrode layer 511A does not include a recess recessed towards the multilayer body 10 side in the lamination direction T.

As illustrated in FIG. 5B, in the LT cross-sectional view along the lamination direction T and the length direction L, the first main surface-side conductive resin layer 611A includes a conductive resin layer recess 611c that is recessed towards the multilayer body 10 side at the boundary interface 611k with the first Ni plated layer 71A of the first main surface-side plated layer 711A. The conductive resin layer recess 611c is formed substantially at the same position as the first main surface-side recess 510A in the length direction L, corresponding to the first main surface-side recess 510A in the length direction L. The region of the conductive resin layer recess 611c in the length direction L corresponds to the region of the first main surface-side recess 510A in the length direction L (indicated by the reference numeral 700 in FIG. 5A).

As illustrated in FIG. 5B, in the LT cross-sectional view, the deepest portion 611d of the conductive resin layer recess 611c is provided more inward than the inner end portion 560a of the first main surface-side base electrode layer 511A, i.e., towards the central side of the multilayer body 10 in the length direction L. The deepest portion 611d of the conductive resin layer recess 611c refers to the portion closest to the first main surface TS1 of the multilayer body 10 in the lamination direction T, within the conductive resin layer recess 611c.

The thickness 611t of the first main surface-side conductive resin layer 611A at the deepest portion 611d of the conductive resin layer recess 611c is, for example, preferably between about 5 μm and about 20 μm inclusive. The thickness 611t is the distance between the deepest portion 611d and the first main surface TS1 in the lamination direction T.

As illustrated in FIG. 5B, in the LT cross-sectional view, the first main surface-side conductive resin layer 611A includes the conductive resin layer recess 611c, as well as a first conductive resin layer bulge 810 and a second conductive resin layer bulge 820. The first conductive resin layer bulge 810 is provided on the inner side of the conductive resin layer recess 611c in the length direction L. The second conductive resin layer bulge 820 is formed on the outer side of the conductive resin layer recess 611c in the length direction L. In other words, the first main surface-side conductive resin layer 611A includes the conductive resin layer recess 611c, as well as the first conductive resin layer bulge 810 on the central side of the multilayer body 10 in the length direction L, and the second conductive resin layer bulge 820 on the end portion side of the multilayer body 10 in the length direction L, between which the conductive resin layer recess 611c is interposed.

The surface of multilayer body 10 closest to, i.e., at the shortest distance from, the vertexes 810p of the first conductive resin layer bulge 810 and the vertex 820p of the second conductive resin layer bulge 820, is the first main surface TS1. The distance between the vertex 810p of the first conductive resin layer bulge 810 and the first main surface TS1 of multilayer body 10 in the lamination direction T is the height 810H of the first conductive resin layer bulge 810. Similarly, the distance between the vertex 820p of the second conductive resin layer bulge 820 and the first main surface TS1 of multilayer body 10 in the lamination direction T is the height 820H of the second conductive resin layer bulge 820.

In the present example embodiment, the height 810H of the first conductive resin layer bulge 810 is preferably higher than the height 820H of the second conductive resin layer bulge 820. The height 810H of the first conductive resin layer bulge 810 and the height 820H of the second conductive resin layer bulge 820 may be the same or different. In the cases of being different, as mentioned, the height 810H of the first conductive resin layer bulge 810 may be higher or lower than the height 820H of the second conductive resin layer bulge 820.

In the present example embodiment, the height 810H of the first conductive resin layer bulge 810 is, for example, preferably between about 15 μm and about 30 μm inclusive. On the other hand, the height 820H of the second conductive resin layer bulge 820 is, for example, preferably between about 5 μm and about 20 μm inclusive.

The multilayer ceramic capacitor 1 of the present example embodiment is mounted on a board. Mounting to the board may involve, for example, soldering, where the external electrodes 40 are joined to terminals on the board. When the first main surface-side external electrode 411A is joined to the board by soldering, the flexure stress generated in the first main surface-side external electrode 411A concentrates particularly at the inner end portion 411e of the first main surface-side external electrode 411A or the inner end portion 611e of the first main surface-side conductive resin layer 611A as illustrated in FIG. 5B, and transmits as tensile stress to the multilayer body 10, potentially causing cracks or the like in the multilayer body 10. In the example embodiment of the multilayer ceramic capacitor 1, the first main surface-side external electrode 411A includes the first main surface-side recess 510A, and the first main surface-side conductive resin layer 611A includes the conductive resin layer recess 611c, thereby dispersing the flexure stress to the first main surface-side recess 510A and the conductive resin layer recess 611c or around these recesses. This advantageous effect mitigates the flexure stress, thus reducing or preventing the occurrence of cracks in the multilayer body 10. As a result, durability under harsh conditions is improved.

When the first main surface-side external electrode 411A of the multilayer ceramic capacitor 1 according to the present example embodiment is mounted to a board, namely, joined by soldering, the vertex 710p of the first bulge 710 and the vertex 720p of the second bulge 720, which are separated in the length direction L, between which the first main surface-side recess 510A is interposed, are placed on the surface of the terminals or the like of the board. In other words, the first main surface-side external electrode 411A is joined to the board, in the state supported at two points. The solder enters inside the first main surface-side recess 510A and contacts the inner surface of the first main surface-side recess 510A. The distance L1 between the vertex 710p of the first bulge 710 and the vertex 720p of the second bulge 720 in the length direction L is longer than the distance L2 between the inner end portion 411e of the first main surface-side external electrode 411A in the length direction L and the vertex 710p of the first bulge 710 in the length direction L. As a result, the inner surface area of the first main surface-side recess 510A increases, enlarging the contact area for the solder. Consequently, even if the shape of the surface of the first main surface-side external electrode 411A is rounded along the length direction L, the effective ground contact area with the board is increased in combination with the state supported at two points, thereby strengthening the bond between the board and the capacitor. In other words, the multilayer ceramic capacitor 1 of the present example embodiment facilitates stability during board mounting.

The dimensions such as the thickness of each layer of the first main surface-side external electrode 411A, the depth of the first main surface-side recess 510A, and the heights of the bulges are measured, for example, by the following example method. Namely, the multilayer ceramic capacitor 1 is polished from either the first lateral surface WS1 or the second lateral surface WS2 to approximately half of the width dimension W. This exposes the LT cross section at the middle position of the multilayer ceramic capacitor 1 in the width direction W. Next, the dimensions in the LT cross section exposed by polishing are measured using a digital microscope.

Next, an example of a method of manufacturing the multilayer ceramic capacitor 1 according to the present example embodiment will be described. The method of manufacturing the multilayer ceramic capacitor 1 according to the present example embodiment is not limited, as long as the requirements described above are satisfied. However, a preferable manufacturing method includes the following steps. The details of each step are described below.

A dielectric sheet for the dielectric layer 20 and a conductive paste for the internal electrode layer 30 are prepared. The dielectric sheet and the conductive paste for the internal electrode layer include binders and solvents. The binders and solvents may be any known ones.

The conductive paste for the internal electrode layer 30 is printed in a predetermined pattern on the dielectric sheet, for example, by screen printing or gravure printing. As a result, a dielectric sheet with a pattern of the first internal electrode layer 31 and a dielectric sheet with a pattern of the second internal electrode layer 32 are prepared.

A predetermined number of dielectric sheets without printed patterns of internal electrode layer are stacked, thus forming a portion that becomes the first main surface-side outer layer portion 12A on the first main surface TS1 side. On top of this, a dielectric sheet with printed patterns of the first internal electrode layer 31 and a dielectric sheet with printed patterns of the second internal electrode layer 32 are sequentially stacked, thus forming a portion that become the inner layer portion 11. On top of the portion that become the inner layer portion 11, a predetermined number of dielectric sheets without printed patterns of internal electrode layer are stacked, thus forming a portion that becomes the second main surface-side outer layer portion 12B on the second main surface TS2 side. Thus, a multilayer sheet is produced.

The multilayer sheet is pressed in the lamination direction using, for example, hydrostatic pressing, thus producing a multilayer block.

The multilayer block is cut into a predetermined size, thus producing multilayer chips. At this time, the corners and edges of the multilayer chips may be rounded by, for example, barrel polishing.

The multilayer chips are fired to produce the multilayer body 10. The firing temperature is, for example, preferably between about 900° C. and about 1400° C. inclusive, depending on the materials of the dielectric layer 20 and the internal electrode layer 30.

A conductive paste to become the base electrode layer 50 is applied to both end surfaces of the multilayer body 10. In the present example embodiment, the base electrode layer 50 is a fired layer. The conductive paste containing glass components and metal components is applied to the multilayer body 10 by methods such as, for example, dipping. Subsequently, a firing process is performed, thus forming the base electrode layer 50. The temperature during the firing process is, for example, preferably between about 700° C. and about 950° C. inclusive.

In the present example embodiment, dipping is conducted such that the first base electrode layer 50A extends from the first end surface LS1 to a portion of the first main surface TS1 and the second main surface TS2. Similarly, dipping is conducted such that the second base electrode layer 50B extends from the second end surface LS2 to a portion of the first main surface TS1 and the second main surface TS2. In this case, dipping is preferably conducted simultaneously such that the first base electrode layer 50A extends to a portion of the first lateral surface WS1 and the second lateral surface WS2. Similarly, dipping is preferably conducted such that the second base electrode layer 50B extends to a portion of the first lateral surface WS1 and the second lateral surface WS2.

The pre-firing multilayer chips and the conductive paste applied to the multilayer chips may be simultaneously fired. In this case, the fired layers are preferably formed by firing a material including a ceramic material instead of glass components. In this case, as the ceramic material to be added, a ceramic material of the same type as the dielectric layer 20 is particularly preferably used. In this case, a conductive paste is applied to the pre-firing multilayer chips, and the multilayer chips as well as the conductive paste applied to the multilayer chips are simultaneously fired, thus forming the multilayer body 10 with the fired layers.

Next, the conductive resin layer 60 is formed. In the present example embodiment, the conductive resin layer 60 is formed on the surface of the base electrode layer 50 and a portion of the surface of the multilayer body 10.

First, a conductive resin paste is prepared, in which conductive fillers are dispersed within the thermosetting resin as the base resin that becomes the resin portion. The conductive resin paste is produced by stirring and mixing the thermosetting resin and the conductive fillers. Therefore, the conductive fillers are uniformly dispersed within the conductive resin paste. Here, the thermosetting resin is, for example, epoxy resin. The conductive filler is, for example, Ag metal powder.

Subsequently, the conductive resin paste is applied onto the base electrode layer 50 using, for example, a dipping method, and a thermal treatment is conducted, for example, at temperature between about 200° C. and about 550° C. inclusive. This process thermally cures the resin portion, thus forming the conductive resin layer 60. The atmosphere during this heat treatment is, for example, preferably nitrogen ($N_2$). The oxygen concentration is preferably maintained at, for example, about 100 ppm or below to prevent the resin from scattering and the various metal components from oxidizing.

In the present example embodiment, dipping is conducted such that the first conductive resin layer 60A extends from the first end surface LS1 to a portion of the first main surface TS1 and the second main surface TS2. Similarly, dipping is conducted such that the second conductive resin layer 60B extends from the second end surface LS2 to a portion of the first main surface TS1 and the second main surface TS2. In this case, for example, dipping is preferably conducted simultaneously such that the first conductive resin layer 60A extends to a portion of the first lateral surface WS1 and the second lateral surface WS2. Similarly, for example, dipping is preferably conducted such that the second conductive resin layer 60B extends to a portion of the first lateral surface WS1 and the second lateral surface WS2.

Afterwards, the plated layer 70 is formed on the surface of the conductive resin layer 60. In the present example embodiment, the Ni plated layer 71 and the Sn plated layer 72 are formed on the conductive resin layer 60. The Ni plated layer 71 and the Sn plated layer 72 are sequentially formed using, for example, an electroplating method. Barrel plating, for example, is a preferred method of plating.

The following may be an example of a method of forming the groove-shaped recesses in the main surface-side external electrodes and the lateral surface-side external electrodes of the external electrodes 40 as in the present example embodiment.

Figure 6A:
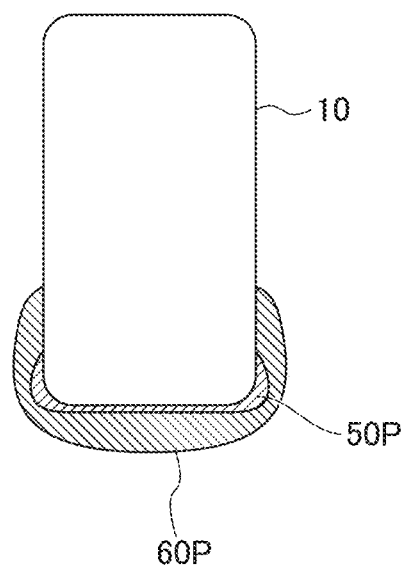
FIG. 6A is a diagram illustrating a method of manufacturing the multilayer ceramic capacitor according to an example embodiment of the present invention, illustrating a first step of forming an external electrode on a multilayer body.
Figure 6B:
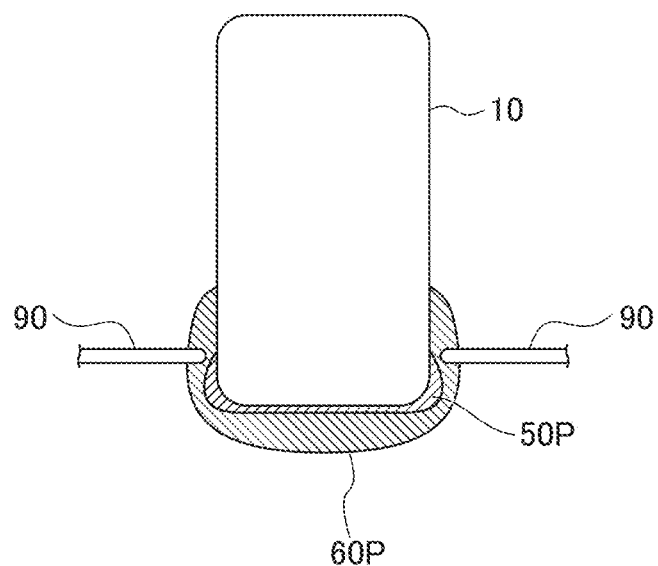
FIG. 6B is a diagram illustrating a method of manufacturing the multilayer ceramic capacitor according to an example embodiment of the present invention, illustrating a second step of forming the external electrode on the multilayer body.
Figure 6C:
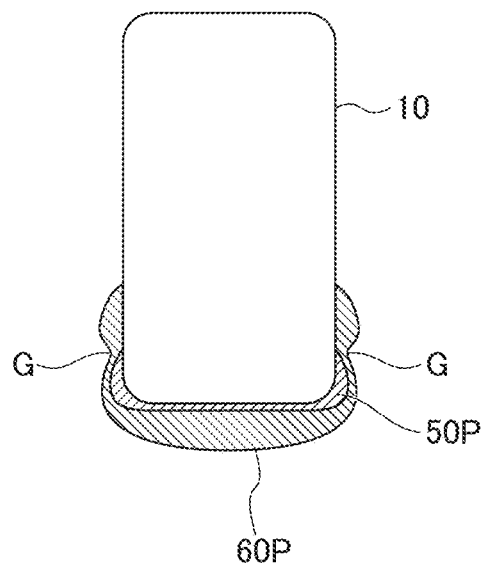
FIG. 6C is a diagram illustrating a method of manufacturing the multilayer ceramic capacitor according to an example embodiment of the present invention, illustrating a third step of forming the external electrode on the multilayer body.

FIGS. 6A to 6C schematically illustrate the steps of forming the base electrode layer 50 and the conductive resin layer 60 with this method. As illustrated in FIG. 6A, the base electrode paste 50P, which becomes the base electrode layer 50, is applied by dipping to the end portions of the multilayer body 10 in the length direction L, then the conductive resin paste 60P is applied by dipping, which becomes the conductive resin layer 60. Next, as illustrated in FIG. 6B, the multilayer body 10 is passed between a pair of rod-shaped tools 90 facing each other. The passage direction herein is the direction perpendicular or substantially perpendicular to the paper surface of FIG. 6B. As a result, as illustrated in FIG. 6C, groove-shaped recesses G are formed on both sides of the conductive resin paste 60P that is the conductive resin layer 60, at the tips of the pair of rod-shaped tools 90. These recesses G become the first main surface-side recess 510A, the second main surface-side recess 520A, the first lateral surface-side recess 530A, the second lateral surface-side recess 540A, the first main surface-side recess 510B, the second main surface-side recess 520B, the first lateral surface-side recess 530B, and the second lateral surface-side recess 540B. Thereafter, the Ni plated layer 71 and the Sn plated layer 72 are formed on the conductive resin layer 60.

The recesses can also be formed by appropriately adjusting the viscosity of the base electrode paste 50P and the conductive resin paste 60P, or by innovating the dipping method.

The multilayer ceramic capacitor is manufactured through the manufacturing steps described above.

The configurations of the multilayer ceramic capacitor 1 is not limited to those illustrated in FIGS. 1 to 4B. For example, the multilayer ceramic capacitor 1 may include a two-portion structure, a three-portion structure, or a four-portion structure as illustrated in FIGS. 7A, 7B, and 7C.

Figure 7A:
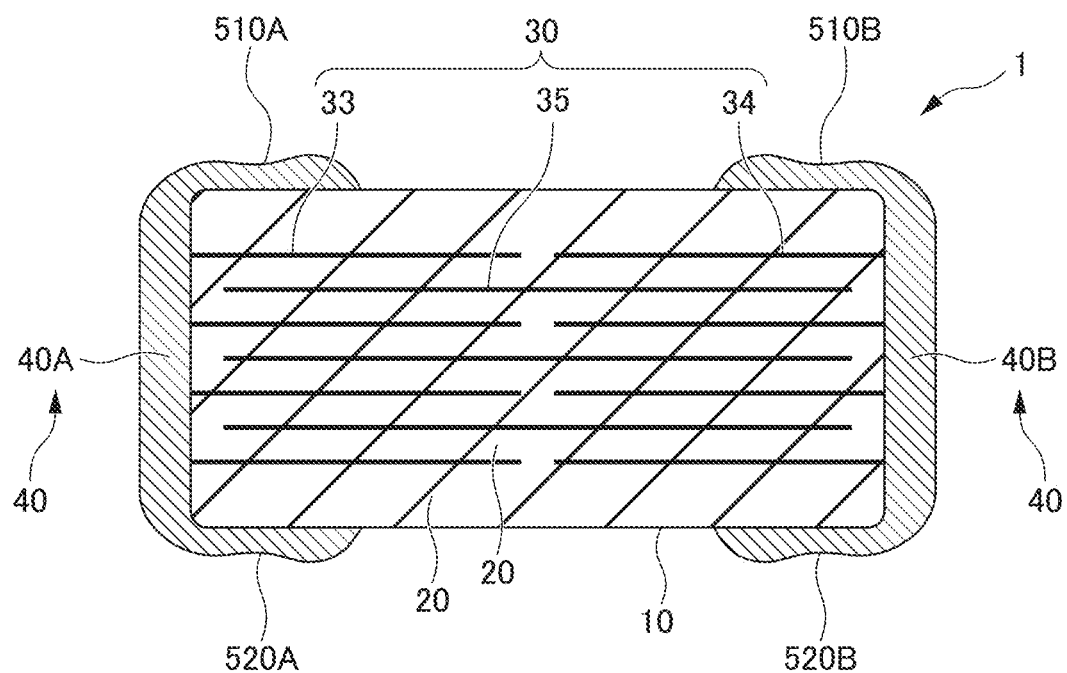
FIG. 7A is a diagram illustrating a two-portion-structured multilayer ceramic capacitor according to an example embodiment of the present invention.

The multilayer ceramic capacitor 1 illustrated in FIG. 7A includes a two-portion structure, including a floating internal electrode layer 35 as a floating inner conductive layer that does not extend to either the first end surface LS1 or the second end surface LS2, in addition to the first internal electrode layer 33 and the second internal electrode layer 34 as the internal electrode layer 30.

Figure 7B:
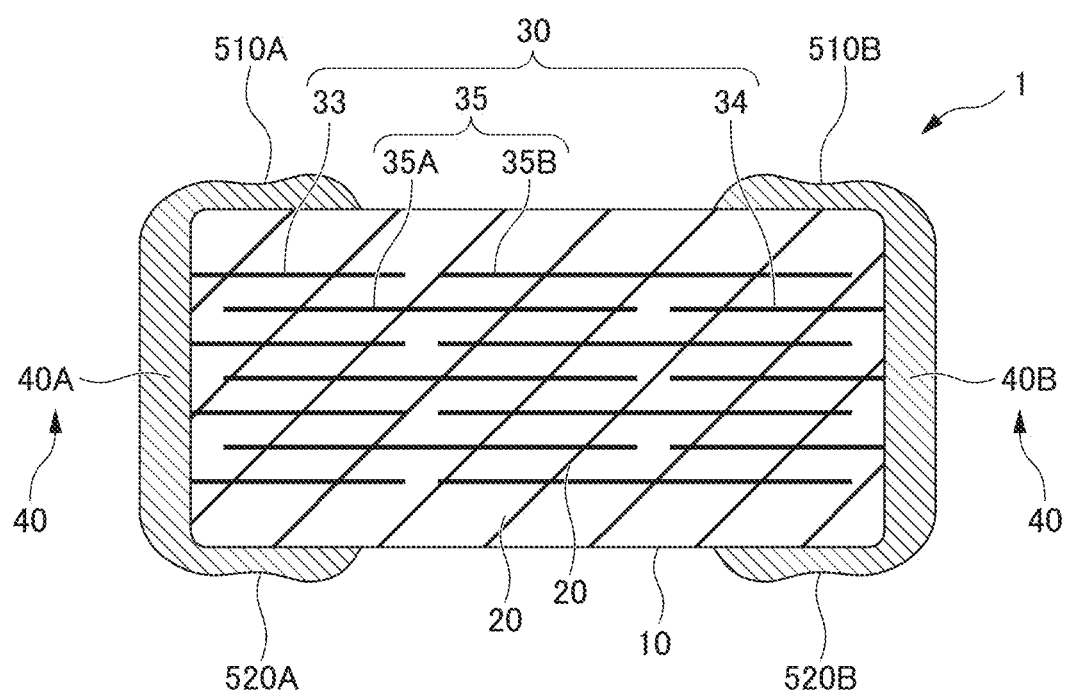
FIG. 7B is a diagram illustrating a three-portion-structured multilayer ceramic capacitor according to an example embodiment of the present invention.

The multilayer ceramic capacitor 1 illustrated in FIG. 7B includes a three-portion structure, including a first floating internal electrode layer 35A and a second floating internal electrode layer 35B, as the floating internal electrode layer 35.

Figure 7C:
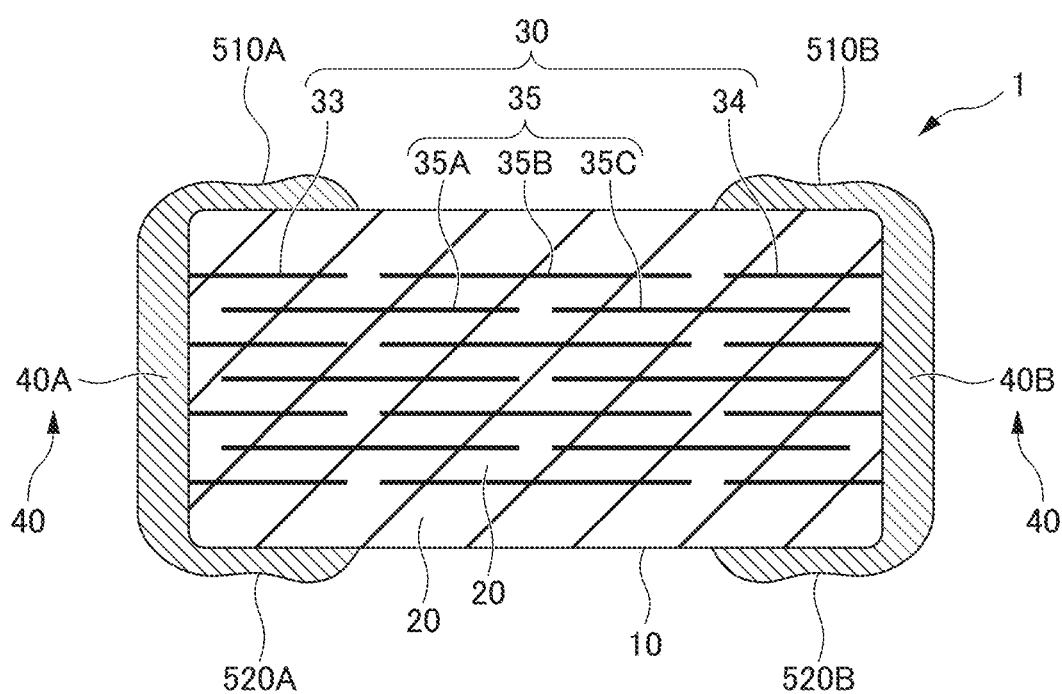
FIG. 7C is a diagram illustrating a four-portion-structured multilayer ceramic capacitor according to an example embodiment of the present invention.

The multilayer ceramic capacitor 1 illustrated in FIG. 7C includes a four-portion structure, including the first floating internal electrode layer 35A, the second floating internal electrode layer 35B, and a third floating internal electrode layer 35C, as the floating internal electrode layer 35.

The multilayer ceramic capacitor 1 can be structured with a plurality of divided counter electrode portions by providing the floating internal electrode layers 35 as the internal electrode layer 30. As a result, a plurality of capacitor components are formed between the counter internal electrode layers 30, and the capacitor components are connected in series. Therefore, the voltage applied to each capacitor component is reduced, enabling the achievement of high withstand voltage of the multilayer ceramic capacitor 1. The multilayer ceramic capacitor 1 in the present example embodiment may include a multi-portion structure including four or more portions.

In the multilayer ceramic capacitors 1 with the structures illustrated in FIGS. 7A, 7B, and 7C, as in the case of the above-described example embodiments, both of the first external electrode 40A and the second external electrode 40B include the main surface-side external electrodes that include the main surface-side recesses. Although not illustrated, the conductive resin layers defining each main surface-side external electrode include the conductive resin layer recesses that are recessed towards the side of the multilayer body at the boundary interface with the main surface-side plated layer.

In the multilayer ceramic capacitors 1 with the structures illustrated in FIGS. 7A, 7B, and 7C, as in the case of the above-described example embodiments, both of the first external electrode 40A and the second external electrode 40B include the lateral surface-side external electrodes that include the lateral surface-side recesses. Although not illustrated, the conductive resin layers defining each lateral surface-side external electrode include the conductive resin layer recesses that are recessed towards the side of the multilayer body at the boundary interface with the lateral surface-side plated layer.

In particular, the multilayer ceramic capacitors 1 with the structures such as the two-portion structure, three-portion structure, and four-portion structure including the floating internal electrode layer 35 illustrated in FIGS. 7A to 7C are effective to be used under high voltage. However, compressive stress is preferably applied to the multilayer body 10 as an electrostrictive countermeasure under high voltage, and in order to achieve this, the plating thickness of the external electrodes on the main surfaces and the lateral surfaces of the multilayer body 10 is increased. However, this can lead to a problem where the flexural resistance deteriorates due to increased tensile stress at the inner end portion 411e of the external electrode 40 and the inner end portion 611e of the conductive resin layer 60A, as illustrated in FIG. 5B. However, as in the present example embodiment, for example, the recesses (the first main surface-side recess and the second main surface-side recess) are provided in the main surface-side external electrodes, and the conductive resin layer recesses are provided, thereby allowing for improving the flexural resistance, thus reducing or preventing the occurrence of cracks in the multilayer body 10.

The multilayer ceramic capacitor 1 according to the example embodiment can achieve the following effects.

When mounting the multilayer ceramic capacitor 1 on a board, the contact area for the solder entering the recesses increases, thereby enlarging the effective ground contact area with the board, and facilitating stability during board mounting.

In the multilayer ceramic capacitor 1 according to the present example embodiment, the multilayer body 10 includes the counter electrode portion 11E, in which the first internal electrode layer 31 and the second internal electrode layer 32 face each other in the lamination direction T, and end surface-side outer layer portions LG between the counter electrode portion 11E and the first end surface LS1, as well as between the counter electrode portion 11E and the second end surface LS2, respectively. The distance L1 is preferably longer than the length L4 of the end surface-side outer layer portion LG in the length direction L.

This enables a sufficiently long distance L1 between the vertex 710p of the first bulge 710 and the vertex 720p of the second bulge 720 in the length direction L. Thus, when mounting the multilayer ceramic capacitor 1 on a board, the ground contact area for the solder entering the recesses increases, thereby enlarging the effective grounding contact area with the board, and facilitating stability during board mounting.

In the multilayer ceramic capacitor 1 according to the present example embodiment, the distance L1 is preferably greater than the maximum thickness of the main surface-side external electrode in the lamination direction T.

This enables a sufficiently long distance L1 between the vertex 710p of the first bulge 710 and the vertex 720p of the second bulge 720 in the length direction L. Thus, when mounting the multilayer ceramic capacitor 1 on a board, the ground contact area for the solder entering the recesses increases, thus enlarging the effective grounding contact area with the board, and facilitating stability during board mounting.

In the multilayer ceramic capacitor 1 according to the present example embodiment, the distance L3 between the inner end portion 441e of the main surface-side external electrode in the length direction and the deepest portion 510d of the main surface-side recess in the length direction is longer than the length L4 of the end surface-side outer layer portion LG in the length direction.

This also enables a sufficiently long distance L1 between the vertex 710p of the first bulge 710 and the vertex 720p of the second bulge 720 in the length direction L. Thus, when mounting the multilayer ceramic capacitor 1 on a board, the ground contact area for the solder entering the recesses increases, thereby enlarging the effective grounding contact area with the board, and facilitating stability during board mounting.

In the multilayer ceramic capacitor 1 according to the present example embodiment, the height 710H of the first bulge 710, being the shortest distance from the surface of the multilayer body 10 to the vertex 710p of the first bulge 710 in the lamination direction T, is preferably higher than the height 720H of the second bulge 720, being the distance from the surface of the multilayer body 10 to the vertex 720p of the second bulge 720 in the lamination direction T.

When mounting the multilayer ceramic capacitor 1 on a board, this enables an increased amount of solder between the vertex 720p of the second bulge 720 and the surface of the board, thus improving the bonding strength.

In the multilayer ceramic capacitor 1 according to the present example embodiment, in a cross-sectional view along the lamination direction T and the length direction L, when the shortest distance between the line connecting the vertex 710p of the first bulge 710 and the vertex 720p of the second bulge 720 and the deepest portion 510d of the recess is defined as the depth D of the recess, the depth D is preferably between about 5% and about 15% inclusive of the maximum thickness of the main surface-side external electrode layer.

This enables for a relatively large depth of the recess, thus increasing the area within the recess and the contact area for the solder. Consequently, the effective ground contact area with the board increases, facilitating stability during board mounting.

In the multilayer ceramic capacitor 1 according to the present example embodiment, the internal electrode layer 30 includes the floating internal electrode layer 35 as a floating inner conductive layer, which does not extend to either the first end surface LS1 or the second end surface LS2, and which faces at least one of the first internal electrode layer 31 or the second internal electrode layer 32, in which a dielectric layer 20 of the dielectric layers 20 is interposed between the first internal electrode layer 31 and the second internal electrode layer 32.

This enables for high withstand voltage of the multilayer ceramic capacitor 1.

In the multilayer ceramic capacitor 1 according to the present example embodiment, the distance L3 between the inner end portion 411e of the first main surface-side external electrode 411A and the deepest portion 510d of the first main surface-side recess 510A in the length direction L is longer than the length L4 of the end surface-side outer layer portion LG of the multilayer body 10 in the length direction L, in which the distance L3 is preferably at least about 300 µm.

As a result, the region with at least a certain thickness of the first main surface-side external electrode 411A increases over the distance L3, thus improving the mechanical strength of the inner end portion 411e, and improving flexural resistance.

In an example embodiment of the multilayer ceramic capacitor 1, each of the first external electrode 40A and the second external electrode 40B may include a lateral surface-side external electrode, which may also include a recess, as in the case of the main surface-side external electrodes.

Thus, the multilayer ceramic capacitor 1 according to present the example embodiment includes the multilayer body 10 that includes the dielectric layers 20 as the plurality of ceramic layers, and the internal electrode layers 30 as the plurality of inner conductive layers alternately stacked in the lamination direction T as the height direction. The multilayer body 10 also includes the first main surface TS1 and the second main surface TS2 on opposite sides in the lamination direction T, the first end surface LS1 and the second end surface LS2 on opposite sides in the length direction L orthogonal or substantially orthogonal to the lamination direction T, and the first lateral surface WS1 and the second lateral surface WS2 on opposite sides in the width direction W orthogonal or substantially orthogonal to both the lamination direction T and the length direction L. The multilayer body 10 also includes the pair of external electrodes 40 spaced apart from each other at the end portions of the multilayer body 10 in the length direction L. The internal electrode layers 30 include the first internal electrode layer 31 as the first inner conductive layer extending to the first end surface LS1, and the second internal electrode layer 32 as the second inner conductive layer extending to the second end surface LS2. The external electrodes 40 include a lateral surface-side external electrode on at least one of the first lateral surface or the second lateral surface. In a cross-sectional view along the height direction and the length direction, the lateral surface-side external electrode includes, on a surface thereof, a recess recessed towards the side of the multilayer body, and the first bulge on the central side of the multilayer body in the length direction and the second bulge at the end portion side of the multilayer body in the length direction. The distance L1 between the vertex of the first bulge and the vertex of the second bulge in the length direction is longer than the distance L2 between the inner end portion of the lateral surface-side external electrode and the vertex of the first bulge in the length direction.

The present invention is not limited to the configurations of the example embodiments and can be appropriately modified and applied within the scope that does not change the scope of the present invention. Combinations of two or more of any individual configurations described in the example embodiments are also included in example embodiments of the present invention.

For example, the multilayer ceramic capacitor 1 may be a two-terminal multilayer ceramic capacitor including two external electrodes or a multi-terminal multilayer ceramic capacitor including a plurality of external electrodes.

In example embodiment, the multilayer ceramic capacitor including dielectric ceramics has been described as examples of the multilayer ceramic electronic component. However, the multilayer ceramic electronic component disclosed herein is not limited to this, and various multilayer ceramic electronic components such as piezoelectric components using piezoelectric ceramics, thermistors using semiconductor ceramics, and inductors using magnetic ceramics can also be applied. Examples of piezoelectric ceramics may include PZT (lead zirconate titanate) ceramics, examples of semiconductor ceramics may include spinel ceramics, and examples of magnetic ceramics may include ferrites.

The external electrodes 40 in the example embodiments include the conductive resin layer 60. However, the external electrodes 40 do not have to include the conductive resin layer 60.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
   a multilayer body including a plurality of ceramic layers and a plurality of inner conductive layers stacked alternately in a height direction, a first main surface and a second main surface on opposite sides in the height direction, a first end surface and a second end surface on opposite sides in a length direction orthogonal or substantially orthogonal to the height direction, and a first lateral surface and a second lateral surface on opposite sides in a width direction orthogonal or substantially orthogonal to both the height direction and the length direction; and
   a pair of external electrodes spaced apart from each other at both of the first and second end surfaces of the multilayer body in the length direction; wherein
   the plurality of inner conductive layers include:
      a first inner conductive layer extending to the first end surface; and
      a second inner conductive layer extending to the second end surface;
   the pair of external electrodes include a main surface-side external electrode on at least one of the first main surface or the second main surface;
   in a cross-sectional view along the height direction and the length direction, the main surface-side external electrode includes, on a surface thereof, a recess recessed towards a side of the multilayer body;
   a first bulge is provided on a central side of the multilayer body in the length direction, and a second bulge is provided at an end portion side of the multilayer body in the length direction, between which the recess is interposed; and
   a distance L1 between a vertex of the first bulge and a vertex of the second bulge in the length direction is longer than a distance L2 between an inner end portion of the main surface-side external electrode and the vertex of the first bulge in the length direction.

2. The multilayer ceramic electronic component according to claim 1, wherein
   the multilayer body further includes:
      a counter electrode portion in which the first inner conductive layer and the second inner conductive layer face each other in the height direction; and
      an end surface-side outer layer portion between the counter electrode portion and the first end surface and between the counter electrode portion and the second end surface;
   the distance L1 is longer than a length L4 of the end surface-side outer layer portion in the length direction.

3. The multilayer ceramic electronic component according to claim 1, wherein the distance L1 is greater than a maximum thickness of the main surface-side external electrode in the height direction.

4. The multilayer ceramic electronic component according to claim 1, wherein a distance L3 between the inner end portion of the main surface-side external electrode and a deepest portion of the recess in the length direction is longer than a length L4 of the end surface-side outer layer portion in the length direction.

5. The multilayer ceramic electronic component according to claim 1, wherein a height of the first bulge, being a shortest distance from a surface of the multilayer body to the vertex of the first bulge in the height direction, is higher than a height of the second bulge, being a distance from a surface of the multilayer body to the vertex of the second bulge in the height direction.

6. The multilayer ceramic electronic component according to claim 1, wherein, in a cross-sectional view of the main surface-side external electrode along the height direction and the length direction, when a shortest distance between a line connecting the vertex of the first bulge and the vertex of the second bulge and a deepest portion of the recess is defined as a depth of the recess, the depth of the recess is between about 5% and about 15% inclusive of a maximum thickness of the main surface-side external electrode layer.

7. The multilayer ceramic electronic component according to claim 1, wherein
   the inner conductive layer includes a floating inner conductive layer that does not extend to either of the first end surface or the second end surface, the floating inner conductive layer facing at least one of the first inner conductive layer or the second inner conductive layer; and
   a ceramic layer of the plurality of ceramic layers is interposed between the first inner conductive layer and the second inner conductive layer.

8. The multilayer ceramic electronic component according to claim 1, wherein
   a dimension of the multilayer body in the length direction is between about 0.2 mm and about 10 mm inclusive;
   a dimension of the multilayer body in the height direction is between about 0.1 mm and about 10 mm inclusive; and
   a dimension of the multilayer body in the width direction is between about 0.1 mm and about 10 mm inclusive.

9. The multilayer ceramic electronic component according to claim 1, wherein each of the plurality of ceramic layers includes at least one of $BaTiO_3$, $CaTiO_3$, $SrTiO_3$, or $CaZrO_3$ as a main component.

10. The multilayer ceramic electronic component according to claim 9, wherein each of the plurality of ceramic layers includes at least one of Mn compounds, Fe compounds, Cr compounds, Co compounds, or Ni compounds as an accessory component.

11. The multilayer ceramic electronic component according to claim 1, wherein a thickness of each of the plurality of ceramic layers is between about 0.5 μm and about 30 μm inclusive.

12. The multilayer ceramic electronic component according to claim 1, wherein a number of the plurality of ceramic layers is between 10 and 1500 inclusive.

13. The multilayer ceramic electronic component according to claim 1, wherein each of the plurality of inner conductive layers includes at least one of Ni, Cu, Ag, Pd, or Au, or alloys including at least one of Ni, Cu, Ag, Pd, or Au.

14. The multilayer ceramic electronic component according to claim 1, wherein a thickness of each of the plurality of inner conductive layers is between about 0.2 μm and about 2.0 μm inclusive.

15. The multilayer ceramic electronic component according to claim 1, wherein a number of the plurality of inner conductive layers is between 10 and 1500 inclusive.

16. The multilayer ceramic electronic component according to claim 1, wherein each of the pair of external electrodes includes a base electrode layer, a conductive resin layer, and a plated layer.

17. The multilayer ceramic electronic component according to claim 16, wherein the plate layer includes a Ni plated layer and a Sn plated layer on the Ni plated layer.

18. The multilayer ceramic electronic component according to claim 16, wherein the base electrode layer includes a metal component and at least one of a glass component or a ceramic component.

19. The multilayer ceramic electronic component according to claim 1, wherein the metal component includes at least one of Cu, Ni, Ag, Pd, Ag—Pd alloy, or Au.

20. The multilayer ceramic electronic component according to claim 1, wherein the glass component includes at least one of B, Si, Ba, Mg, Al, or Li.

* * * * *